(12) United States Patent
Ercan et al.

(10) Patent No.: US 9,701,537 B1
(45) Date of Patent: Jul. 11, 2017

(54) CLAUS PROCESS FOR SULFUR RECOVERY WITH INTERMEDIATE WATER VAPOR REMOVAL BY ADSORPTION

(71) Applicant: Saudi Arabian Oil Company, Dhahran (SA)

(72) Inventors: Cemal Ercan, Dhahran (SA); Rashid M. Othman, Khobar (SA); Yuguo Wang, Dhahran (SA)

(73) Assignee: SAUDI ARABIAN OIL COMPANY (SA)

( * ) Notice: Subject to any disclaimer, the term of this patent is extended or adjusted under 35 U.S.C. 154(b) by 0 days.

(21) Appl. No.: 14/988,032

(22) Filed: Jan. 5, 2016

(51) Int. Cl.
| | | |
|---|---|---|
| *C01B 17/04* | (2006.01) | |
| *B01D 53/75* | (2006.01) | |
| *B01D 53/76* | (2006.01) | |
| *B01D 53/86* | (2006.01) | |
| *B01J 19/24* | (2006.01) | |

(52) U.S. Cl.
CPC ......... *C01B 17/0456* (2013.01); *B01J 19/245* (2013.01)

(58) Field of Classification Search
CPC . C01B 17/0404; C01B 17/0456; B01D 53/74; B01D 53/75; B01D 53/76; B01D 53/8612; B01D 53/8615; B01D 53/869
See application file for complete search history.

(56) References Cited

U.S. PATENT DOCUMENTS

| | | | | |
|---|---|---|---|---|
| 4,980,146 A | * | 12/1990 | Kvasnikoff | ........ B01D 53/8615 423/574.1 |
| 5,294,428 A | | 3/1994 | Watson | |
| 5,965,100 A | | 10/1999 | Khanmamedov | |
| 6,214,311 B1 | | 4/2001 | Kwong | |
| 6,508,863 B1 | | 1/2003 | Byrne et al. | |
| 6,893,620 B2 | * | 5/2005 | Watson | .................. B01D 53/52 422/171 |

(Continued)

FOREIGN PATENT DOCUMENTS

| | | | | |
|---|---|---|---|---|
| RU | 2116123 C1 | * | 7/1998 | ......... B01D 53/8603 |
| WO | 9507855 | | 3/1995 | |

OTHER PUBLICATIONS

Jalal Zargaran and Majid Bahmani, Simulation of Separation of Valuable Components from Tehran Refinery Flare Stack Gases, 53 Petroleum & Coal 78-83 (2011).

*Primary Examiner* — Timothy Vanoy
(74) *Attorney, Agent, or Firm* — Bracewell LLP; Constance Gall Rhebergen

(57) ABSTRACT

A method to recover sulfur comprising the steps of feeding an acid gas stream to a combustion furnace, condensing the cooled furnace stream to produce a first gas stream, feeding the first gas stream to a first adsorber comprises a molecular sieve, feeding the first hot dry gas stream to a first catalytic reactor, cooling the first catalytic outlet stream in a first condenser, feeding the second gas stream to a second adsorber, feeding the second hot dry gas stream to a second catalytic reactor, cooling the second catalytic outlet stream in a second condenser, introducing the third gas stream to a third adsorber, feeding the third hot dry gas stream to a third catalytic reactor to produce a third catalytic outlet stream, and cooling the third catalytic outlet stream in a third condenser to produce a third sulfur stream and a tail gas stream.

17 Claims, 11 Drawing Sheets

(56) References Cited

U.S. PATENT DOCUMENTS

| | | | |
|---|---|---|---|
| 6,919,059 B2* | 7/2005 | Watson | B01D 53/52 423/224 |
| 7,250,149 B1 | 7/2007 | Smith | |
| 7,311,891 B2 | 12/2007 | Dolan et al. | |
| 8,449,860 B2 | 5/2013 | Gupta | |
| 2002/0025292 A1* | 2/2002 | Watson | B01D 53/002 423/573.1 |
| 2004/0096381 A1* | 5/2004 | Watson | B01D 53/52 423/224 |
| 2007/0134147 A1 | 6/2007 | Graville | |

\* cited by examiner

CLAUS PROCESS FOR SULFUR RECOVERY WITH INTERMEDIATE WATER VAPOR REMOVAL BY ADSORPTION

TECHNICAL FIELD

Disclosed are methods for sulfur recovery.

BACKGROUND

Sulfur recovery refers to the conversion of hydrogen sulfide ($H_2S$) to elemental sulfur. Hydrogen sulfide is a byproduct of processing natural gas and refining high-sulfur crude oils. The conventional method of sulfur recovery is the Claus process. Approximately 90 percent to 95 percent (%) of recovered sulfur is produced by the Claus process. A conventional Claus process can recover between 95% and 98% of the hydrogen sulfide.

The conventional Claus process includes a thermal combustion stage and a catalytic reaction stage. In terms of equipment, the Claus plant (Claus unit) includes a thermal reactor and two or three catalytic reactors (Claus converters). Typical sulfur recovery efficiencies for Claus plants with two Claus converters (reactors) is between 90 and 97%, and for a Claus plant with three converters between 95 and 98%. But there is increasing demand to achieve higher sulfur removal and recovery efficiency due to tight emissions regulations. Recent environmental regulations regarding sulfur oxides (SOx) emissions place a stringent requirement on commercial sulfur recovery and accordingly, most countries require sulfur recovery efficiency in the range of 98.5% to 99.9% or higher.

The addition of a tail-gas treatment unit (TGTU) can increase sulfur recovery to or above 99.9%, but requires complex and expensive equipment. The TGTU entails either an add-on unit at the end of the Claus unit or a modification to the Claus unit itself. The add-on TGTU at the end of the Claus unit is generally used when the Claus process includes two Claus converters. Although there are several varieties of tail gas treatment technologies, they can be grouped into the following four broad categories: sub-dew point Claus process, direct oxidation of $H_2S$ to sulfur, sulfur dioxide ($SO_2$) reduction and recovery of $H_2S$, and $H_2S$ combustion to $SO_2$ and recovery of $SO_2$.

Sub-dew point Claus processes are processes based on a Claus converter performing at temperatures below the sulfur dew point (lower temperature is desirable due to equilibrium nature of the Claus catalytic reaction). Sub-dew point processes provide high equilibrium conversions in one catalyst bed, but are complicated by the need for periodic catalyst regeneration by sulfur evaporation at elevated temperatures. To accommodate for regeneration, such processes are usually performed in two or three (or even more) parallel reactors, periodically undergoing reaction and regeneration. Cold-bed-adsorption (CBA) is the most efficient sub-dew point process and can achieve 99% sulfur recovery.

Processes involving direct oxidation of $H_2S$ to sulfur are based on selective oxidation of $H_2S$ by oxygen to elemental sulfur using selective catalysts.

TGTU technology based on $SO_2$ reduction and recovery of $H_2S$ involves the catalytic hydrogenation of leftover sulfur species to $H_2S$, absorption of the $H_2S$ with amine solution and then recycling the $H_2S$ back to the Claus furnace.

TGTU technology based on $H_2S$ combustion to $SO_2$ and recovery of $SO_2$ involves the combustion of leftover $H_2S$ in the tail gas stream to $SO_2$, absorption of $SO_2$ with a solvent (wet scrubbing), and recycling the $SO_2$ back to the feed to Claus plant. Although $SO_2$ scrubbing, also known as flue gas scrubbing, has not been commercially tested as a TGTU, the technology has been extensively used as flue gas scrubbing for coal based power stations.

SUMMARY

Disclosed are methods for sulfur recovery.

In a first aspect, a method to recover sulfur from hydrogen sulfide in an acid gas stream is provided. The method includes the steps of feeding the acid gas stream to a combustion furnace to produce a furnace outlet stream. The combustion furnace configured to convert the hydrogen sulfide to elemental sulfur, where the furnace outlet stream includes elemental sulfur, hydrogen sulfide, sulfur dioxide, and water vapor. The step of introducing the furnace outlet stream to a waste heat boiler to produce a cooled furnace outlet stream, the waste heat boiler configured to reduce a temperature of the furnace outlet stream, condensing the cooled furnace stream in a sulfur condenser to produce a liquid sulfur stream and a first gas stream, the sulfur condenser configured to reduce a temperature of the cooled furnace stream to a temperature below a dew point of elemental sulfur and above a dew point of water, feeding the first gas stream to a first adsorber to produce a first dry gas stream and a first water stream, wherein the first adsorber includes a molecular sieve, wherein the first dry gas stream is in the absence of water vapor, wherein the first dry gas stream includes hydrogen sulfide and sulfur dioxide. The method further including the steps of heating the first dry gas stream in a first reheater to produce a first hot dry gas stream, wherein the first hot dry gas stream is at a first temperature, feeding the first hot dry gas stream to a first catalytic reactor to produce a first catalytic outlet stream, wherein the first catalytic outlet stream includes elemental sulfur, hydrogen sulfide, sulfur dioxide, and water vapor, cooling the first catalytic outlet stream in a first condenser to produce a first sulfur stream and a second gas stream, the first condenser configured to condense the elemental sulfur in the first catalytic outlet stream such that the first sulfur stream includes liquid sulfur, wherein a temperature in the first condenser is between the dew point of sulfur and the dew point of water, wherein the second gas stream includes hydrogen sulfide, sulfur dioxide, and water vapor, feeding the second gas stream to a second adsorber to produce a second dry gas stream and a second water stream, wherein the second adsorber includes a molecular sieve, wherein the second dry gas stream includes hydrogen sulfide and sulfur dioxide, wherein the second dry gas stream is in the absence of water vapor, heating the second dry gas stream in a second reheater to produce a second hot dry gas stream. The second hot dry gas stream is at a second temperature, where the second temperature is lower than the first temperature. The method further includes the steps of feeding the second hot dry gas stream to a second catalytic reactor to produce a second catalytic outlet stream, wherein the second catalytic outlet stream includes elemental sulfur, hydrogen sulfide, sulfur dioxide, and water vapor, cooling the second catalytic outlet stream in a second condenser to produce a second sulfur stream and a third gas stream, the second condenser configured to condense the elemental sulfur in the second catalytic outlet stream such that the second sulfur stream includes liquid sulfur, wherein a temperature in the second condenser is between the dew point of sulfur and the dew point of water, wherein the third gas stream includes hydrogen sulfide, sulfur dioxide, and water vapor, introducing the third gas stream to a third adsorber to produce a third dry gas stream and a third water stream, wherein the third adsorber includes a molecular sieve, wherein the third dry gas stream includes hydrogen sulfide and sulfur dioxide, wherein the third dry gas stream is in the absence of water vapor, heating the third dry gas stream in a third reheater to produce a third hot dry gas stream. The third hot dry gas stream is at a third temperature, where the third temperature is lower than the second temperature. The method further including the steps of feeding the third hot dry gas stream to a third catalytic reactor to produce a third catalytic outlet stream, wherein the third catalytic outlet stream includes elemental sulfur, hydrogen sulfide, sulfur dioxide, and water vapor, and cooling the third catalytic outlet stream in a third condenser to produce a third sulfur stream and a tail gas stream, the third condenser configured to condense the elemental sulfur in the third catalytic outlet stream such that the third sulfur stream includes liquid sulfur, wherein a temperature in the third condenser is between the dew point of sulfur and the dew point of water, wherein the tail gas stream includes hydrogen sulfide, sulfur dioxide, and water vapor.

In certain aspects of the present invention, a total conversion can be determined. In certain aspects of the present invention, the total conversion exceeds 99% by weight. In certain aspects of the present invention, the molecular sieve is molecular sieve 3A. In certain aspects of the present invention, the first temperature is 235° C. In certain aspects of the present invention, the second temperature is 215° C. In certain aspects of the present invention, the third temperature is 205° C.

In a second aspect of the present invention, a system to recover sulfur from hydrogen sulfide in an acid gas stream is provided. The system includes a combustion furnace, the combustion furnace configured to convert the hydrogen sulfide to elemental sulfur to produce a furnace outlet stream, wherein the furnace outlet stream includes elemental sulfur, hydrogen sulfide, sulfur dioxide, and water vapor, a waste heat boiler fluidly connected to the combustion furnace, the waste heat boiler configured to remove heat from the furnace outlet stream to produce a cooled furnace stream, a sulfur condenser fluidly connected to the waste heat boiler, the sulfur condenser configured to condense the elemental sulfur in cooled furnace stream to produce a liquid sulfur stream and a first gas stream, wherein the gas stream is in the absence of elemental sulfur, wherein the first gas stream includes water vapor, a first adsorber fluidly connected to the sulfur condenser, the first adsorber configured to remove water vapor from the first gas stream to produce a first dry gas stream and a first water stream, wherein the first adsorber includes a molecular sieve, wherein the first dry gas stream includes hydrogen sulfide and sulfur dioxide and is in the absence of water vapor, a first Claus catalytic stage fluidly connected to the first adsorber, the first Claus catalytic stage configured to produce a first sulfur stream and a second gas stream, a second adsorber fluidly connected to the first Claus catalytic stage, the second adsorber configured to remove water vapor from the second gas to produce a second dry gas stream, wherein the second adsorber includes a molecular sieve, wherein the second dry gas stream includes hydrogen sulfide and sulfur dioxide and is in the absence of water vapor, a second Claus catalytic stage fluidly connected to the second adsorber, the second Claus catalytic stage configured to produce a second sulfur stream and a third gas stream, a third adsorber fluidly connected to the second Claus catalytic stage, the third adsorber configured to remove water vapor from the third gas to produce a third dry gas stream, wherein the third adsorber includes a molecular sieve, wherein the third dry gas stream includes hydrogen sulfide and sulfur dioxide and is in the absence of water vapor, and a third Claus catalytic stage fluidly connected to the third adsorber, the third Claus catalytic stage configured to produce a third sulfur stream and a tail gas stream.

In certain aspects of the present invention, a total conversion can be determined. In certain aspects of the present invention, the total conversion exceeds 99% by weight. In certain aspects of the present invention, the molecular sieve is molecular sieve 3A. In certain aspects of the present invention, the first Claus catalytic stage includes a first reheater fluidly connected to the first adsorber, the first reheater configured to increase a temperature of the first dry gas stream to produce a first hot dry gas stream, wherein the first hot dry gas stream is at a first temperature, a first catalytic reactor fluidly connected to the first reheater, the first catalytic reactor configured to convert hydrogen sulfide and sulfur dioxide to elemental sulfur to produce a first catalytic outlet stream, wherein the first catalytic outlet stream includes hydrogen sulfide, sulfur dioxide, elemental sulfur and water, and a first condenser, the first condenser fluidly connected to the first catalytic reactor, the first condenser configured to condense the elemental sulfur in the first catalytic outlet stream to produce a first sulfur stream and the second gas stream, wherein the second gas stream includes hydrogen sulfide, sulfur dioxide, and water vapor. In certain aspects of the present invention, the first temperature is 235° C. In certain aspects of the present invention, the second Claus catalytic stage includes a second reheater fluidly connected to the second adsorber, the second reheater configured to increase a temperature of the second dry gas stream to produce a second hot dry gas stream, wherein the second hot dry gas stream is at a second temperature, a second catalytic reactor fluidly connected to the second reheater, the second catalytic reactor configured to convert hydrogen sulfide and sulfur dioxide to elemental sulfur to produce a second catalytic outlet stream, wherein the second catalytic outlet stream includes hydrogen sulfide, sulfur dioxide, elemental sulfur and water, and a second condenser, the second condenser fluidly connected to the second catalytic reactor, the second condenser configured to condense the elemental sulfur in the second catalytic outlet stream to produce a second sulfur stream and the second gas stream, wherein the second gas stream includes hydrogen sulfide, sulfur dioxide, and water vapor. In certain aspects of the present invention, the second temperature is 215° C. In certain aspects of the present invention, the third Claus catalytic stage includes a third reheater fluidly connected to the third adsorber, the third reheater configured to increase a temperature of the third dry gas stream to produce a third hot dry gas stream, wherein the third hot dry gas stream is at a third temperature, a third catalytic reactor fluidly connected to the third reheater, the third catalytic reactor configured to convert hydrogen sulfide and sulfur dioxide to elemental sulfur to produce a third catalytic outlet stream, wherein the third catalytic outlet stream includes hydrogen sulfide, sulfur dioxide, elemental sulfur and water, and a third condenser, the third condenser fluidly connected to the third catalytic reactor, the third condenser configured to condense the elemental sulfur in the third catalytic outlet stream to produce a third sulfur stream and the third gas stream, wherein the third gas stream includes hydrogen sulfide, sulfur dioxide, and water vapor. In certain aspects of the present invention, the third temperature is 205° C.

BRIEF DESCRIPTION OF THE DRAWINGS

These and other features, aspects, and advantages of the inventive scope will become better understood with regard to the following descriptions, claims, and accompanying drawings. It is to be noted, however, that the drawings illustrate only several embodiments and are therefore not to be considered limiting of the invention's scope.

DETAILED DESCRIPTION

Figure 1:
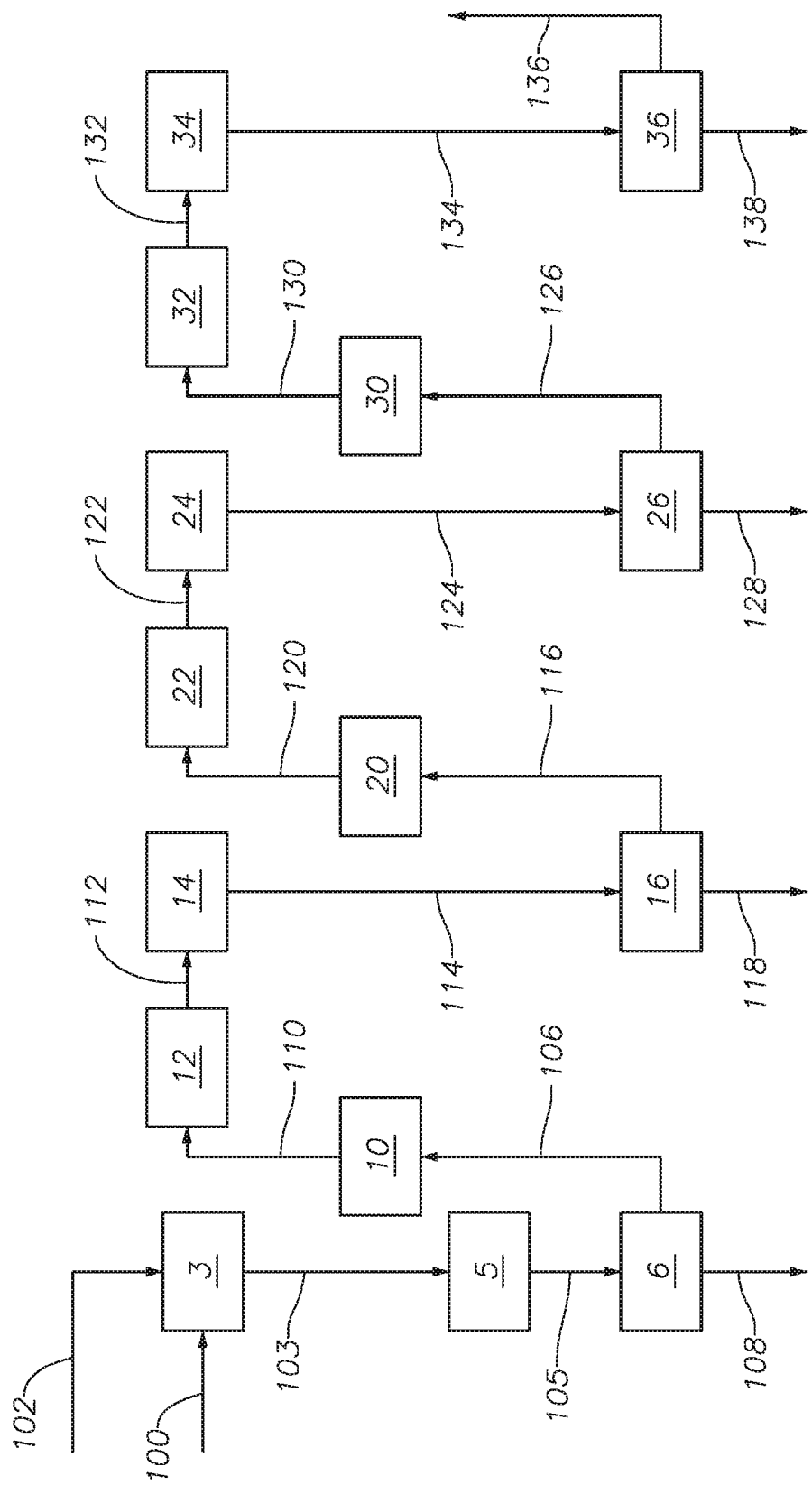
FIG. 1 is a process flow diagram of the process of the present invention including three adsorbers.

While the inventive scope will be described with several embodiments, it is understood that one of ordinary skill in the relevant art will appreciate that many examples, variations and alterations to the apparatus and methods described herein are within the scope and spirit of the invention. Accordingly, the embodiments described are set forth without any loss of generality, and without imposing limitations, on the claimed invention. Those of skill in the art understand that the inventive scope includes all possible combinations and uses of particular features described in the specification.

The present invention provides a method for recovering elemental sulfur from an acid gas stream containing hydrogen sulfide. The method is an improvement to the conventional Claus process. The method of the present invention advantageously increases the amount of elemental sulfur recovered and therefore reduces the amount of sulfur dioxide vented to atmosphere over a conventional Claus process. Thus, the present invention enables a Claus process to meet more stringent sulfur regulations.

As used herein, and unless otherwise specified the term "elemental sulfur" refers to sulfur vapor, which can be present as $S_2$, $S_3$, $S_4$, $S_5$, $S_6$, $S_7$, and $S_8$, due to simple polymerization. Without being bound to a particular theory, it is noted that high reaction temperatures favor the production of $S_2$ and lower reaction temperatures favor formation of $S_8$.

As used herein, "dew point" refers to the temperature of saturation of a vapor with a liquid. It is the temperature at which liquid evaporates at the same rate at which it condenses. Dew point for any compound is a function of the pressure and the composition of the vapor, including fraction of compound in the vapor. Below the dew point of a component, the component will condense from the vapor phase.

The method of the present invention incorporates removal of water vapor ($H_2O$) to drive the Claus catalytic reaction toward conversion to elemental sulfur. The Claus catalytic reaction occurs in the catalytic reactors of the Claus process, according to the following equation:

$$2H_2S + SO_2 \leftrightarrows \tfrac{3}{8}S_8 + 2H_2O; \ \Delta H = -108 \text{ kJ/mol} \quad (1)$$
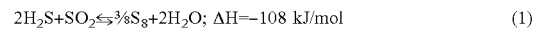

where, $S_8$ is a form of elemental sulfur and $\Delta H$ is the change in enthalpy and the negative value indicates that the reaction is exothermic. Reaction (1), the Claus catalytic reaction, is a reversible exothermic reaction. The extent of reaction is limited by the equilibrium value. One way to drive the reaction toward the right is to lower the temperature. However, the ability to reduce the temperature is limited by the sulfur dew point. Temperatures below the sulfur dew point leads to sulfur condensation in the catalyst bed of the catalytic reactor. Sulfur condensation can lead to impairment of the catalyst surface and to catalyst deactivation. As a result, the temperature in the catalytic reactors is maintained at a temperature between 5° C. and 10° C. above the sulfur dew point. Sulfur condenses at temperatures at or below 175° C., alternately at temperatures between 175° C.-200° C., and alternately at temperatures at or below 200° C. Conventional Claus units are designed such that the lowest reaction temperature is only reached in the last catalytic reactor in the catalytic reaction stage.

Another way to increase conversion to elemental sulfur in reaction (1) is to remove reaction products from the reaction medium. The removal of reaction products results in a higher conversion in an equilibrium reaction. The conventional Claus process focuses on the removal of sulfur by performing reaction (1) in a series of two or three catalytic reactors that include intermediate removal of sulfur in condensers. The present invention advantageously incorporates the additional step of selective removal of water between catalytic reactors to improve the equilibrium in the Claus catalytic reaction. The selective removal of water can shift reaction (1) further to the right due to the second order dependency of the equilibrium constant on water vapor partial pressure as shown in the following equation:

$$K_{eq}(t) = \frac{(P_{H_2O}^2)(P_{S_8}^{\tfrac{3}{8}})}{(P_{H_2S}^2)(P_{SO_2})}, \quad (2)$$

where, $P_{H2O}$ is the partial pressure of water, $P_{S8}$ is the partial pressure of sulfur, $P_{H2S}$ is the partial pressure of hydrogen sulfide and $P_{SO2}$ is the partial pressure of sulfur dioxide and Keq is the equilibrium constant. Reaction (2) has a water vapor partial pressure dependency of power to 2, while a sulfur partial pressure dependency of power to ⅜. Without being bound by a particular theory, it is understood that equilibrium constant, $K_{eq}$ is function of temperature, such that at a given temperature, the value of $K_{eq}$ is fixed. When equilibrium is disturbed, for example by removing either products or reactants, the reaction will shift to counterbalance the disturbance (that is to re-establish the equilibrium).

The method of the present invention incorporates the removal of water vapor in the catalytic reaction stage of the Claus process. The method for recovering sulfur includes an adsorber placed upstream from one or more of the catalytic reactors of the Claus unit.

An acid gas stream and an air feed are fed to a combustion furnace (the Claus thermal stage), where hydrogen sulfide, sulfur dioxide, and oxygen form elemental sulfur according to the Claus thermal reactions, shown in the following equations:

$$H_2S + 3/2 O_2 \rightarrow H_2O + SO_2; \ \Delta H = -44 \text{ kJ/mol} \quad (3)$$
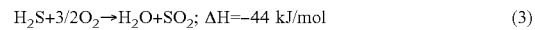

$$2H_2S + SO_2 \rightarrow 3/2 S_2 + 2H_2O; \ \Delta H = 56 \text{ kJ/mol} \quad (4)$$
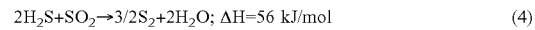

Reaction (3), a combustion reaction is exothermic indicated by the negative ΔH. Reaction (4), the thermal Claus reaction, is a reversible, endothermic reaction, indicated by the positive ΔH. The $SO_2$ can be from any source capable of providing $SO_2$ to be consumed in reaction (4). Examples of sources of $SO_2$ include being produced in reaction (3), being a component of the acid gas stream, being present as a result of a separate feed to the combustion furnace that contains $SO_2$, and a combination of the same.

The acid gas stream can be from any source that produces a stream containing hydrogen sulfide ($H_2S$). The acid gas stream can include $H_2S$, carbon dioxide ($CO_2$), other gases, and combinations of the same. The other gases can include carbon monoxide (CO), water ($H_2O$), nitrogen ($N_2$), hydrogen ($H_2$), and combinations of the same. The nature and composition of the acid gas stream depends on the process that is the source for the acid gas stream and can be determined using any technology capable of analyzing the composition of an acid gas feed stream.

The air feed can be any oxygen ($O_2$) containing gas suitable for use in the combustion furnace. Example gases suitable for use as the air feed include air, oxygen-enriched air, pure $O_2$, or any combination thereof. In at least one embodiment, the air feed is air.

In at least one embodiment, the air feed is adjusted such that one-third of the $H_2S$ present in the acid gas stream is burned to create $SO_2$ as shown in reaction (3) and 60%-70% of the remaining $H_2S$ is converted to elemental sulfur according to reaction (4). The combustion furnace can be any process unit capable of supporting the high temperatures of the Claus thermal reactions, reactions (3) and (4). The combustion furnace operates at a temperature in the range of 900° C. to 1400° C. In at least one embodiment, the temperature in the combustion furnace is greater than 985° C. Without being bound to a particular theory, at temperatures greater than 985° C. reaction (4), the endothermic formation of elemental sulfur is favored. The Claus thermal reactions convert between 60% by weight and 70% by weight of the hydrogen sulfide and sulfur-containing compounds present in the acid gas stream to elemental sulfur. A furnace outlet stream exits the combustion furnace. The furnace outlet stream can include $H_2S$, $SO_2$, $CO_2$, $H_2O$, elemental sulfur, other gases, and combinations of the same.

The furnace outlet stream exits the combustion furnace and is introduced to a waste heat boiler. The furnace outlet stream is at a temperature between 980° C. and 1200° C. The waste heat boiler can be any heat exchanger capable of removing heat from a stream and producing steam. The steam produced in the waste heat boiler can be high pressure steam (above 40 atm (4053 kPa)) or medium pressure stream (about 20 atm (2026.5 kPa). In at least one embodiment, the waste heat boiler produces high pressure steam. The waste heat boiler removes heat from the furnace outlet stream to produce a cooled furnace stream.

The cooled furnace stream is in a gas state. The cooled furnace stream is fed to a sulfur condenser. The sulfur condenser removes heat from the cooled furnace stream causing the elemental sulfur present in the cooled furnace stream to condense and form a liquid sulfur stream. The temperature in the sulfur condenser is between 100° C. and 200° C., alternately between 110° C. and 200° C., 120° C. and 200° C., 130° C. and 200° C., and 140° C. and 200° C. The liquid sulfur stream can contain between 60 weight % and 75 weight % of the sulfur in the acid gas stream, and alternately between 65 weight % and 70 weight % of the sulfur in the acid gas stream.

The components present in the cooled furnace outlet stream that do not condense leave the sulfur condenser as a first gas stream. The first gas stream can contain $H_2S$, $SO_2$, $CO_2$, $H_2O$, process gases, and combinations of the same.

Referring to FIGS. 1-9, acid gas stream 100, air feed 102, furnace outlet stream 103, cooled furnace outlet stream 105, liquid sulfur stream 108, and first gas stream 106 can be understood. Combustion furnace 3, waste heat boiler 5, and sulfur condenser 6 can also be understood.

In a conventional Claus process, the first gas stream is fed to a series of two to three Claus catalytic stages. Each of the Claus catalytic stages includes a reheater, a catalytic reactor, and a condenser. The reheaters can be any heat exchanger capable of heating a gas stream from the condenser outlet temperature to the temperature at which the Claus catalytic reactions in the catalytic reactors occur. Due to the exothermic nature of reaction (1), the catalytic reactor temperature is lower in each subsequent catalytic reactor than the previous catalytic reactor. Without being bound to a particular theory, it is understood that the lower temperature in each subsequent catalytic reactor takes advantage of the equilibrium nature of the reaction. The reaction temperature of the first catalytic reactor is the highest in order to convert other sulfur species. The first reheater can heat the first gas stream to a first temperature above about 205° C., alternately between about 205° C. and about 340° C., alternately between about 215° C. and about 340° C., and alternately between about 225° C. and about 340° C. In at least one embodiment, the first temperature is about 235° C. The second reheater can heat the second gas stream to a second temperature between 5 and 25 degrees below the first temperature, alternately between 10 and 20 degrees below the first temperature, and alternately between 15 and 20 degrees below the first temperature. In at least one embodiment, the second temperature is 20 degrees less than the first temperature. In at least one embodiment, the second temperature is 20 degrees less than the first temperature and the second temperature is 215° C. The third reheater can heat the third gas stream to a third temperature between 5 and 25 degrees below the second temperature, alternately between 10 and 20 degrees below the second temperature, and alternately between 15 and 20 degrees below the second temperature. In at least one embodiment, the second temperature is 10 degrees less than the first temperature. In at least one embodiment, the second temperature is 10 degrees less than the first temperature and the second temperature is 205° C. The specific temperature in each reheater can be designed based on the overall system.

In the catalytic reactors, the hydrogen sulfide and sulfur dioxide are converted to elemental sulfur and water according to reaction (1). The catalytic reactors include a catalyst bed. The catalyst in the catalyst bed of the catalytic reactors can be any catalyst that catalyzes reaction (1). The catalyst can include alumina, titanium dioxide, or combinations thereof. Without being bound to a particular theory, it is observed that reaction (1) produces primarily $S_8$ from the reactants $H_2S$ and $SO_2$, whereas reaction (4) produces primarily $S_2$. One of skill in the art will understand that both forms of sulfur, $S_2$ and $S_8$, are recoverable as liquid sulfur. A catalytic outlet stream exits each of the catalytic reactors and is fed to the condensers. The catalytic outlet stream can include elemental sulfur, $H_2S$, $H_2O$, $SO_2$, other gases, and combinations of the same.

The condensers can be any heat exchanger capable of cooling each of the catalytic outlet streams to a temperature at which sulfur condenses to produce a sulfur stream, but above which water remains as a vapor. The sulfur stream includes liquid sulfur. In at least one embodiment, the temperature in the condensers is between 101° C. and 200° C. The condensers can be designed to cool to temperatures at which all of the sulfur is removed.

Figure 2:
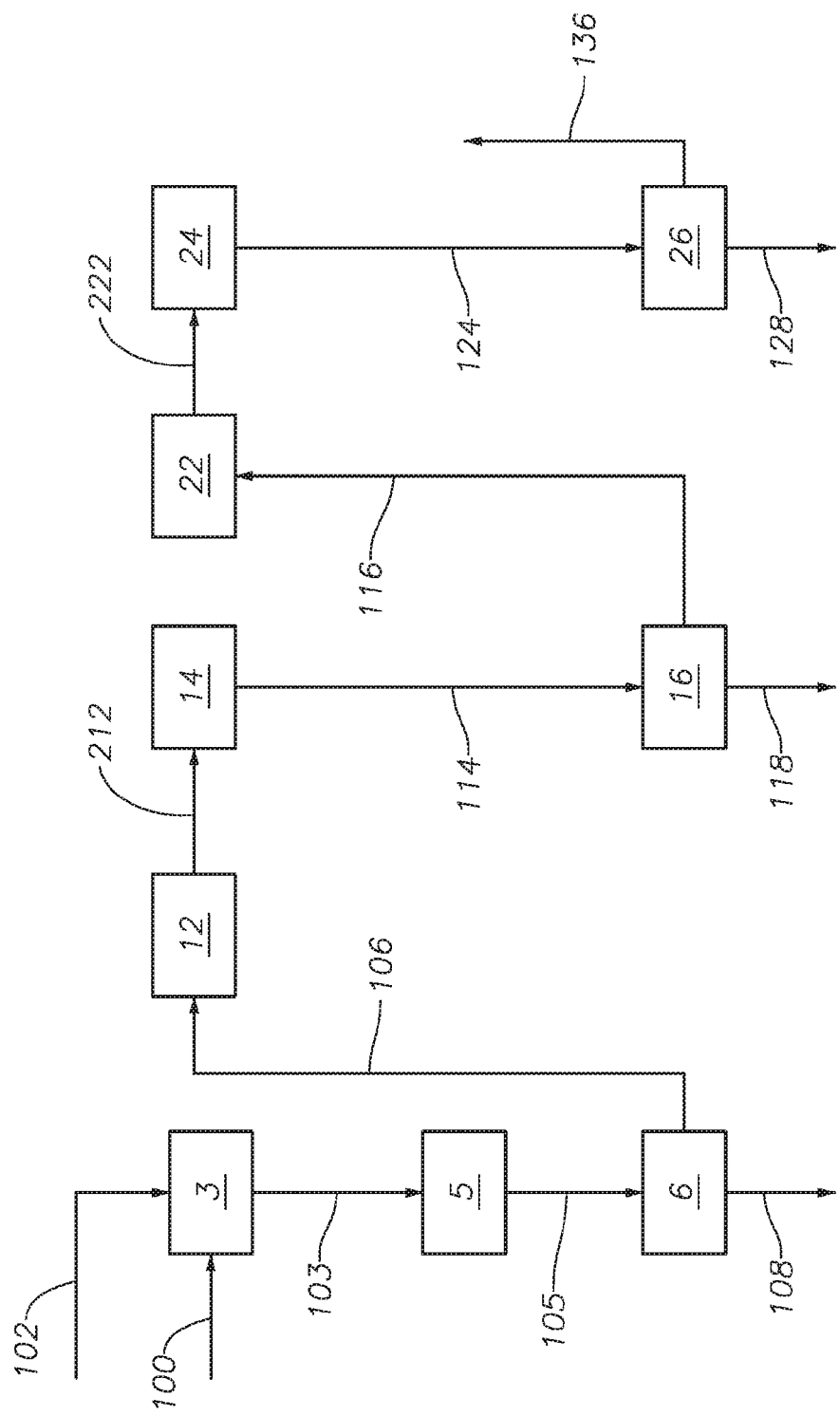
FIG. 2 is a process flow diagram of a conventional Claus process having two catalytic reactors.
Figure 3:
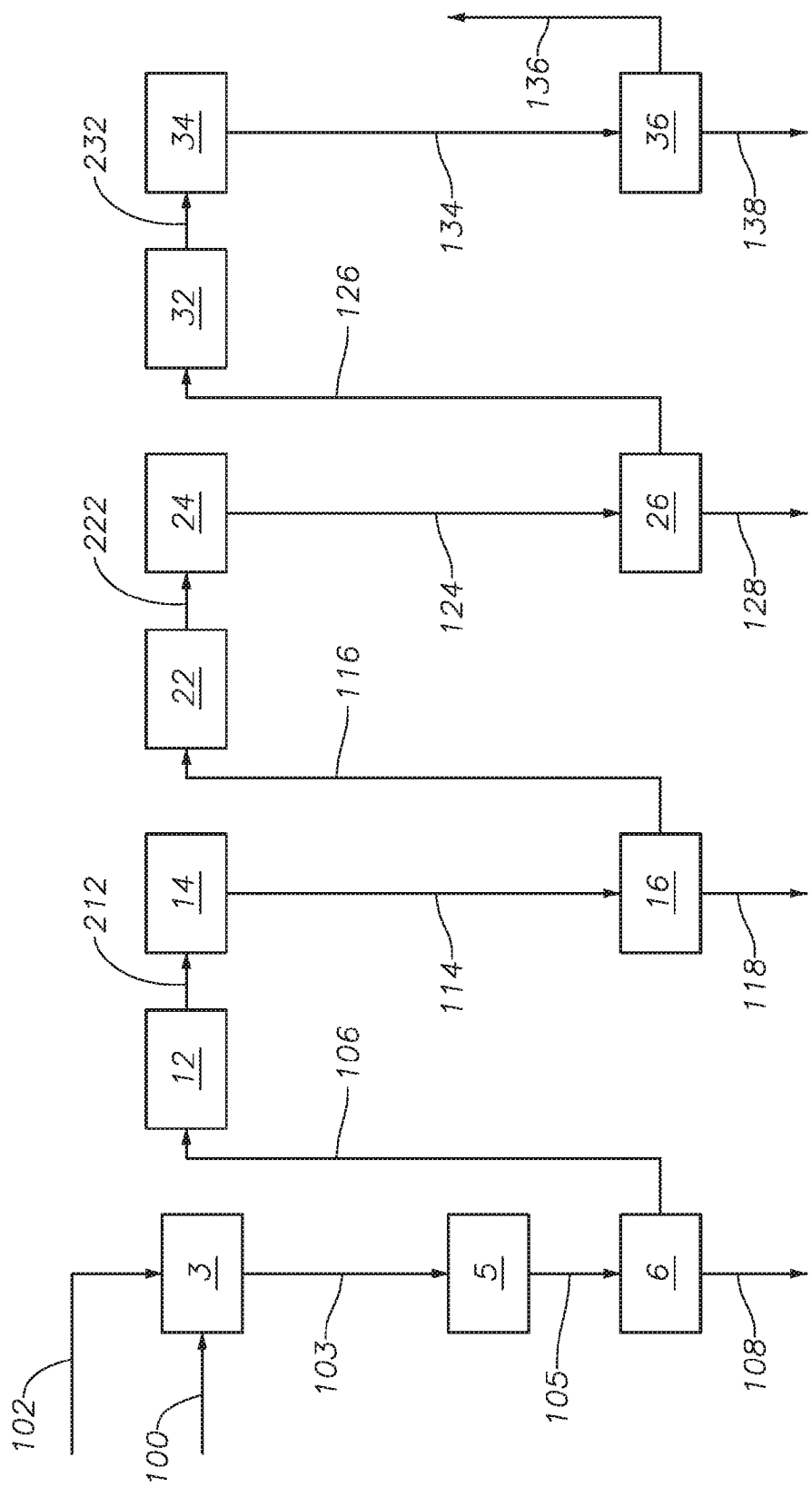
FIG. 3 is a process flow diagram of a conventional Claus process having three catalytic reactors.

The Claus catalytic stages can be understood with reference to FIGS. 2 and 3. FIG. 2 depicts a system with two Claus catalytic stages: a first Claus catalytic stage includes first reheater 12, first catalytic reactor 14, and first condenser 16; and a second Claus catalytic stage includes second reheater 22, second catalytic reactor 24, and second condenser 26. Referring to FIG. 2 and as described above, first gas stream 106 is fed to first reheater 12 of the first Claus catalytic stage to create first hot wet gas stream 212. First hot wet gas stream 212 is fed to first catalytic reactor 14 to produce first catalytic outlet stream 114. First catalytic outlet stream 114 is introduced to first condenser 16. First condenser 16 condenses elemental sulfur present in first catalytic outlet stream 114 to produce first sulfur stream 118 and second gas stream 116. Second gas stream 116 is fed to second reheater 22 to produce second hot wet gas stream 222. Second hot wet gas stream 222 is fed to second catalytic reactor 24 to produce second catalytic outlet stream 124. Second catalytic outlet stream 124 is introduced to second condenser 26. Second condenser 26 condenses elemental sulfur present in second catalytic outlet stream 124 to produce second sulfur stream 128 and tail gas stream 136. Tail gas stream 136 contains those gases that did not condense in second condenser 26.

FIG. 3 depicts a system with three Claus catalytic stages: a first Claus catalytic stage includes first reheater 12, first catalytic reactor 14, and first condenser 16; a second Claus catalytic stage includes second reheater 22, second catalytic reactor 24, and second condenser 26; and a third Claus catalytic stage includes third reheater 32, third catalytic reactor 34, and third condenser 36. Referring to FIG. 3 and with reference to those elements described in connection with FIG. 2, in a process with three Claus catalytic stages, second condenser 26 produces second sulfur stream 128 and third gas stream 126. Third gas stream 126 contains those gases that did not condense in second sulfur condenser 26. Third gas stream 126 is fed to third reheater 32 to produce third hot wet gas stream 232. Third hot wet gas stream 232 is fed to catalytic reactor 34 to produce third catalytic outlet stream 134. Third catalytic outlet stream 134 is fed to third condenser 36. Third condenser 36 condenses the elemental sulfur in third catalytic outlet stream 134 to produce third sulfur stream 138 and tail gas stream 136. First hot wet gas stream 212 is at a higher temperature than second hot wet gas stream 222 and second hot wet gas stream 222 is at a higher temperature than third hot wet gas stream 232. In the conventional Claus processes described with reference to FIGS. 2 and 3, first gas stream 106, second gas stream 116, and third gas stream 126 and first hot wet gas stream 212, second hot wet gas stream 222, and third hot wet gas stream 232 contain water vapor.

Advantageously, the present invention includes one or more adsorbers situated upstream of each of the Claus catalytic stages. The present invention can include one or fewer adsorbers upstream of each of the reheaters of the Claus catalytic stage.

According to an embodiment of the present invention, the first gas stream exiting the sulfur condenser is fed to an adsorber. The adsorber can remove water vapor from the gas stream to produce a dry gas stream and a water stream. The adsorber can be any adsorption-dehydration column unit designed to remove water vapor from a wet gas stream. "Wet gas stream" as used herein, refers to a stream containing water vapor.

The adsorber can include any molecular sieve capable of selectively adsorbing water vapor from a wet gas stream while rejecting the remaining components in the gas phase due to their larger molecular diameter. Molecular sieves operate by selectively adsorbing certain components in a stream. Molecular sieves suitable for use in the present invention have a pore size measured in Angstroms (Å). Molecular sieves have a crystal lattice that results in a well-ordered pore and cavity structure. The effective channel diameter of the cages of the molecular sieve determines whether or not a molecule with a certain kinetic diameter can diffuse into the cage and be adsorbed. Any molecular sieve that has an adsorption affinity towards water and a channel diameter small enough to exclude hydrogen sulfide, but large enough to allow water to pass through can be used. Examples of molecular sieves that can be used in the present invention include zeolite-3A. Zeolite-3A includes a potassium zeolite, an effective channel diameter (pore diameter) of about 3 Å, and a bulk density of 44 pounds/cubic foot. The kinetic diameter of water is about 2.6 Å. Zeolite-3A adsorbs water vapor and ammonia. Hydrogen sulfide has a kinetic diameter of about 3.60 Å and is not adsorbed by zeolite-3A. Molecular sieve 3A can include a binder. In certain embodiments, the molecular sieve is produced by binding micron sized zeolite crystals together to form pellets, as is known in the art. The binder can include silica or other inert materials. Without being bound by a particular theory, it is understood that because the binder is inert the performance of a molecular sieve is reduced proportionally to the amount of binder. It is understood that a pellet design can minimize the amount of binder without foregoing strength of the pellet. For example, the equilibrium adsorption capacity of a molecular sieve with zeolite-3A pellets with binder is about 20 percent by weight (wt %), in other words, 20% of the total weight is water at equilibrium. The binder in molecular sieve 3A can be about 9 weight %.

Figure 11:
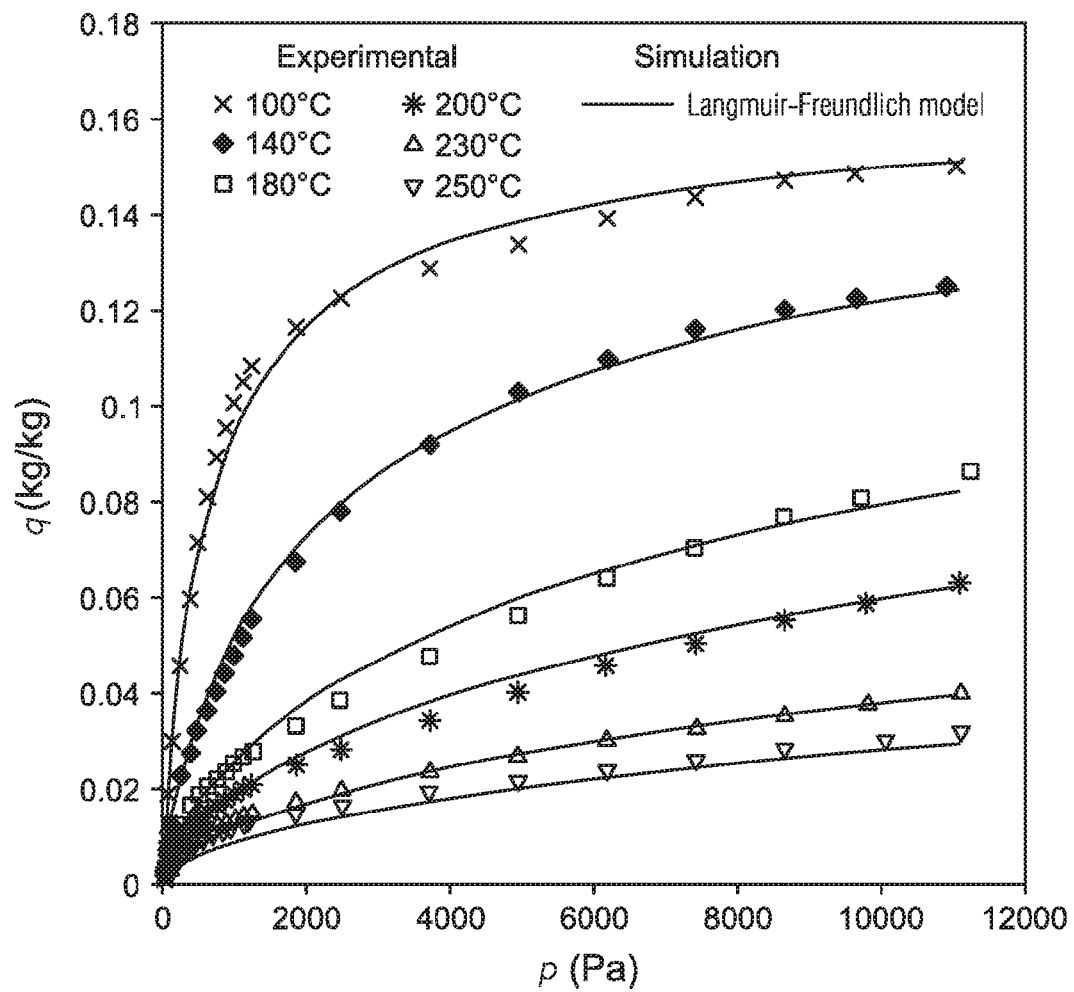
FIG. 11 is a depiction of the isotherms for water vapor on molecular sieve 3A.

The amount of adsorbed water vapor molecules for a given adsorbent is a function of temperature and pressure. The amount of adsorbed water increases with increasing pressure and decreases with increasing temperature. Referring to FIG. 11, the adsorption capacity for molecular sieve 3A at various temperatures (adsorption isotherms) is provided. The adsorption capacity of molecular sieve 3A for water vapor at 100° C. is substantially higher than the adsorption capacity for water at 200° C. The temperature in the adsorber is between 75° C. and 170° C., alternately between 75° C. and 160° C., alternately between 75° C. and 150° C., and alternately between 75° C. and 140° C. In at least one embodiment, the temperature of the adsorber is between 75° C. and 150° C. The concentration of water in the dry gas stream is less than 1 part-per-million (ppm), alternately less than 0.5 ppm, and alternately less than 0.1 ppm. In at least one embodiment, the concentration of water in the dry gas stream is less than 0.1 ppm.

The method for removal of sulfur including adsorbers can be understood with reference to FIGS. 1 and 4-9. FIG. 1 depicts a process with three Claus catalytic stages and an adsorber upstream of each of the Claus catalytic stages. Referring to FIG. 1 and with reference to those elements described in connection with FIGS. 2 and 3, first gas stream 106 is fed to first adsorber 10. First adsorber 10 removes water vapor from first gas stream 106 to produce first dry gas stream 110. First dry gas stream 110 is fed to first reheater 12 to produce hot dry gas stream 112. Hot dry gas stream 112 is in the absence of all or substantially all water vapor. As used herein, "in the absence of substantially all water vapor" or "in the absence of substantially all of the water vapor" means that less than 1.0 ppm water vapor is in hot dry gas stream 112. As used herein "in the absence of water vapor" or "in the absence of all water vapor" means that the hot dry gas stream contains less than 0.1 ppm. First hot dry gas stream 112 is fed to first catalytic reactor 14 to produce first catalytic outlet stream 114. Second gas stream 116 is fed to second adsorber 20. Second adsorber 20 removes water vapor from second gas stream 116 to produce second dry gas stream 120. Second dry gas stream 120 is fed to second reheater 22 to produce second hot dry gas stream 122. Second hot dry gas stream 122 is in the absence of all or substantially all water vapor. Second hot dry gas stream 122 is fed to second catalytic reactor 24 to produce second catalytic outlet stream 124. Third gas stream 126 is fed to third adsorber 30. Third adsorber 30 removes water vapor from third gas stream 126 to produce third dry gas stream 130. Third dry gas stream 130 is fed to third reheater 32 to produce third hot dry gas stream 132. Hot dry gas stream 132 is in the absence of all or substantially all water vapor. Third hot dry gas stream 132 is fed to third catalytic reactor 34 to produce third catalytic outlet stream 134.

First dry gas stream 110, second dry gas stream 120 and third dry gas stream 130 are introduced to first reheater 12, second reheater 22, and third reheater 32 respectively, to heat First dry gas stream 110, second dry gas stream 120 and third dry gas stream 130 to the reaction temperature in first catalytic reactor 14, second catalytic reactor 24, and third catalytic reactor 34, respectively.

With reference to FIGS. 1 and 3, one of skill in the art understands that the compositions of the streams can be the same with respect to the components present, except for the presence of water vapor in certain streams that are not treated by an adsorber. As an example, first hot dry gas stream 112 can contain the same components as first hot wet gas stream 212 except first hot wet gas stream 212 contains water vapor and first hot dry gas stream 112 is in the absence of water vapor.

The method for sulfur removal is in the absence of a condenser designed to condense water vapor from a gas stream. Advantageously, the use of molecular sieves for adsorption can remove all or substantially all of the water vapor from a wet gas stream. The use of molecular sieves advantageously removes water to the ppm level as compared to a condenser which can remove water to the saturation point for the operating temperature and pressure. A condenser cannot be used to condense all or substantially all of the water vapor because the gas stream remains saturated with water vapor due to thermodynamic equilibrium. In a condenser, for any given temperature, the liquid water will be at equilibrium with the vapor (the gas phase will be saturated water vapor), because of this a condenser cannot remove enough water for the purposes of the present invention. In a molecular sieve, the adsorbent can continue to adsorb water vapor and thus remove water until the adsorbent is saturated.

Following the final condenser in the system, the non-condensed components form a tail gas stream. The tail gas stream can contain $H_2S$, $SO_2$, $CO_2$, $H_2O$, other gases, and combinations of the same. Tail gas stream 136 can be fed to an incinerator, can be vented to the atmosphere or an alternate process or alternate process unit for removing contaminants from a stream.

A total conversion can be calculated from the total elemental sulfur recovered and the amount of molecular sulfur in the acid gas stream. Total conversion can be between 99 wt % and 99.9 wt %.

Figure 10:
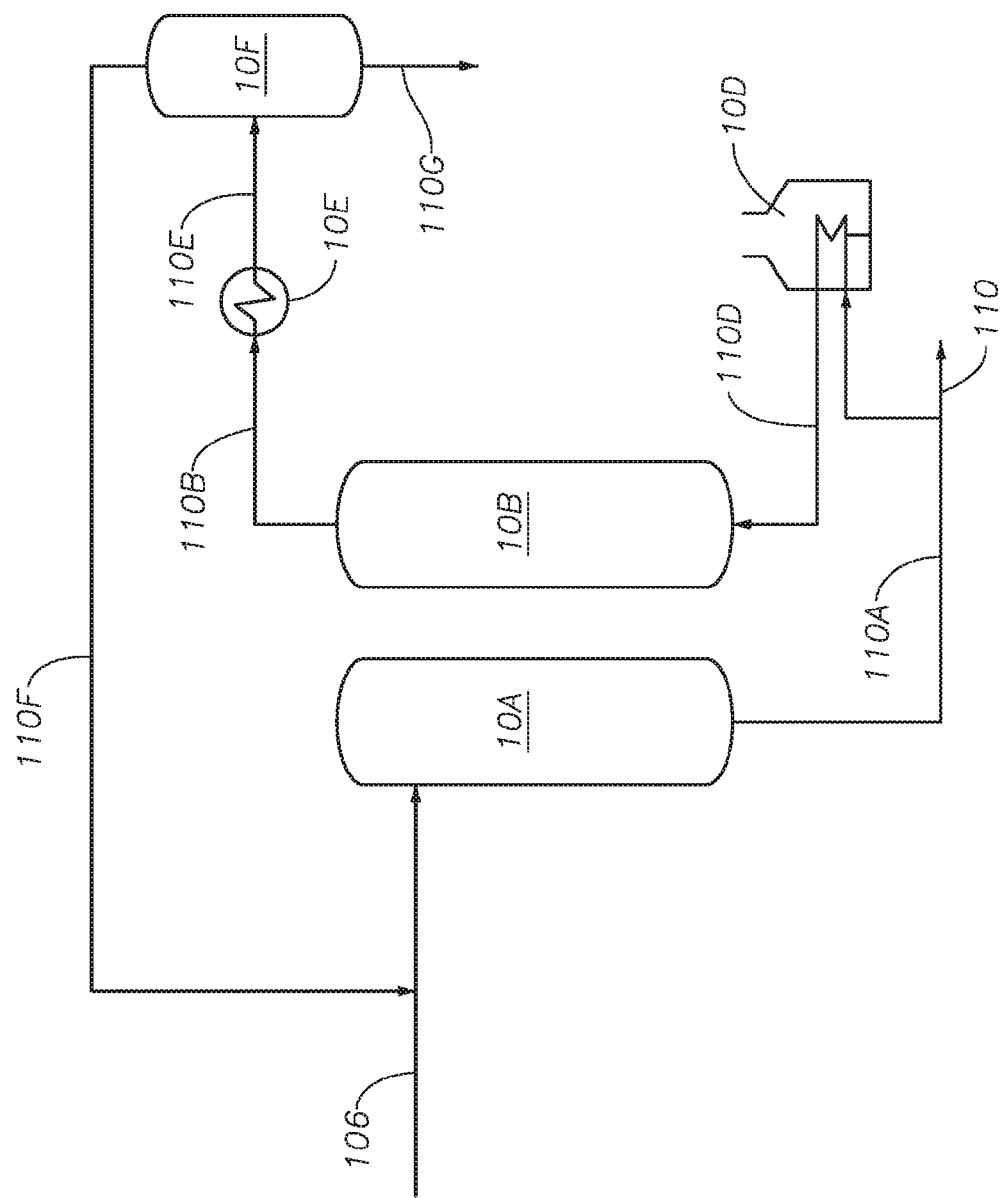
FIG. 10 is a process flow diagram of an adsorber.

As used herein, "adsorber" refers to a two bed system, where at any time, one will be on an adsorption cycle and the second will be on a regeneration cycle. In a pressure swing adsorption (PSA) system, the regeneration cycle is driven by a decrease in the pressure in the regeneration bed compared to the pressure in the adsorption bed, causing components to desorb. In a temperature swing adsorption (TSA) system, the regeneration cycle is driven by an increase in the temperature of the regeneration bed compared to the temperature in the adsorption bed, causing components to desorb. A combination of PSA and TSA can also be used. The pressure in the Claus process is not high enough for a PSA without expensive compression equipment. Therefore, the present invention is in the absence of a PSA process. A TSA system can be used in the present invention. A TSA can be better understood with reference to FIG. 10. As shown in FIG. 10, gas stream 106 is fed to adsorption column 10A to produce dry gas 110A. Adsorption column 10A is at temperature between 75° C. and 170° C., alternately between 100° C. and 170° C., and alternately between 100° C. and 150° C. The residence time in adsorption column 10A can be greater than 2 hours and alternately between 2 hours and 12 hours. Adsorption column 10A contains molecular sieve 3A. Water vapor in gas stream 106 is adsorbed by molecular sieve 3A leaving behind dry gas 110A. A portion of dry gas 110A is fed to regeneration heater 10D and the remaining portion exits as dry gas stream 110. Regeneration heater 10D increases the temperature of dry gas 110A to a temperature in the range between 175° C. and 260° C. to produce heated gas 110D. Heated gas 110D is fed to regeneration column 10B, which increases the temperature in regeneration column 10B. The increased temperature in regeneration column 10B causes water adsorbed on molecular sieve 3A in regeneration column 10B to desorb. The desorbed water, in the form of water vapor, is carried from regeneration column 10B as part of regenerated gas 110B. Regenerated gas 110B is cooled to a temperature below 100° C. to form cooled stream 110E. Cooled stream 110E is fed to separator 10F, where liquid water is separated from the gases in cooled stream 110E to produce water stream 110G and recycle gas stream 110F. Recycle gas stream 110F is mixed with gas stream 106 and fed to adsorption column 10A. In certain embodiments, an adsorber, such as a TSA can include a buffer tank on the inlet stream.

Through valves and other piping components, the adsorption column can be switched to the regeneration column as needed.

EXAMPLES

The process of the present invention can be readily understood by Examples. The following examples were simulated using a HYSYS process simulator to simulate the method of the present invention. The simulations were based on FIGS. 1-9 as indicated below and described above. In all of the Examples, acid gas stream 100 was simulated at a temperature of 30.0° C. and a flow rate of 110.0 kgmol/hr (3848.0 kg/hr). Acid gas stream 100 had a composition of 100.0 kmol/hr of hydrogen sulfide and 10.0 kmol/hr of carbon dioxide. The flow rate of air feed 102 was automatically adjusted by the simulation so combustion furnace 3 had a simulated burn of one-third (⅓) of the hydrogen sulfide present in acid gas stream 100 with air from air feed 102 to produce $SO_2$. Combustion furnace 3 operated in a range 979° C.-1050° C. Gibbs energy minimization was used to simulate the Claus thermal reaction, reaction (3), in combustion furnace 3 and the Claus catalytic reaction, reaction (1), in the catalytic reactors 14, 24, and as applicable, 34. As applicable, adsorbers 10, 20, and 30 were modeled for 100% water vapor removal from gas streams 106, 116, and 126. Water vapor removal of 100% is appropriate given that molecular sieve 3A can remove water vapor to the ppm level.

Example 1

Example 1, a comparative example, was simulated based on FIG. 3, a process flow diagram of a conventional Claus process, including three catalytic reactors: first catalytic reactor 14, second catalytic reactor 24, and third catalytic reactor 34. First reheater 12 increased the temperature of first gas stream 106 to a temperature of 235° C. to produce first hot wet gas stream 212. Second reheater 22 increased the temperature of second gas stream 116 to a temperature of 215° C. to produce second hot wet gas stream 222. Third reheater 32 increased the temperature of third gas stream 126 to a temperature of 205° C. to produce third hot wet gas stream 232. The total sulfur recovered was 3157.8 kg/hr for a total conversion of 98.5 weight percent (wt %) sulfur.

TABLE 1

Stream properties and results in Example 1

| | Stream No. | | | | | | | | |
|---|---|---|---|---|---|---|---|---|---|
| | 103 | 105 | 106 | 114 | 116 | 124 | 126 | 134 | 136 |
| Temperature | 979.0 | 315.0 | 190.0 | 309.6 | 176.0 | 236.3 | 149.0 | 209.8 | 132.0 |
| Flow rate, kgmol/hr | 342.4 | 342.4 | 309.0 | 304.5 | 301.1 | 299.9 | 299.1 | 298.8 | 298.6 |
| Flow rate, kg/hr | 10720.0 | 1072.0 | 8558.0 | 8558.0 | 7802.0 | 7802.0 | 7603.0 | 7603.0 | 7560.0 |
| Component flow rate, kmol/hr | | | | | | | | | |
| $H_2S$ | 21.7612 | 21.7612 | 21.7612 | 6.0443 | 6.0443 | 1.9240 | 1.9240 | 1.0185 | 1.0185 |
| $SO_2$ | 10.8806 | 10.8806 | 10.8806 | 3.0221 | 3.0221 | 0.9620 | 0.9620 | 0.5092 | 0.5092 |
| $H_2O$ | 78.2 | 78.2 | 78.2 | 94.0 | 94.0 | 98.1 | 98.1 | 99.0 | 99.0 |
| $CO_2$ | 10.0 | 10.0 | 10.0 | 10.0 | 10.0 | 10.0 | 10.0 | 10.0 | 10.0 |
| $N_2$ | 188.1 | 188.1 | 188.1 | 188.1 | 188.1 | 188.1 | 188.1 | 188.1 | 188.1 |
| $S_2$ | 33.0752 | 33.0752 | 0.0000 | 0.0741 | 0.0 | 0.0027 | 0.000 | 0.0005 | 0.000 |
| $S_3$ | 0.0 | 0.0000 | 0.0000 | 0.0078 | 0.0 | 0.0002 | 0.000 | 0.0000 | 0.000 |
| $S_4$ | 0.3829 | 0.3829 | 0.0000 | 0.0052 | 0.0 | 0.0002 | 0.000 | 0.0000 | 0.000 |
| $S_5$ | 0.0146 | 0.0145 | 0.0000 | 0.0752 | 0.0 | 0.0098 | 0.000 | 0.0021 | 0.000 |
| $S_6$ | 0.0001 | 0.0001 | 0.0000 | 0.9895 | 0.0 | 0.1980 | 0.000 | 0.0457 | 0.000 |
| $S_7$ | 0.0000 | 0.0000 | 0.0000 | 0.5772 | 0.0 | 0.1081 | 0.000 | 0.0199 | 0.000 |
| $S_8$ | 0.0000 | 0.0000 | 0.0000 | 1.6286 | 0.0 | 0.5269 | 0.000 | 0.1166 | 0.000 |
| Total sulfur, kg/hr | | | 2160.0 | | 756.0 | | 198.2 | | 43.6 |
| Conversion of $H_2S$, wt % | 67.4 | | | | 90.9 | | 97.1 | | 98.5 |

Example 1-1

Figure 4:
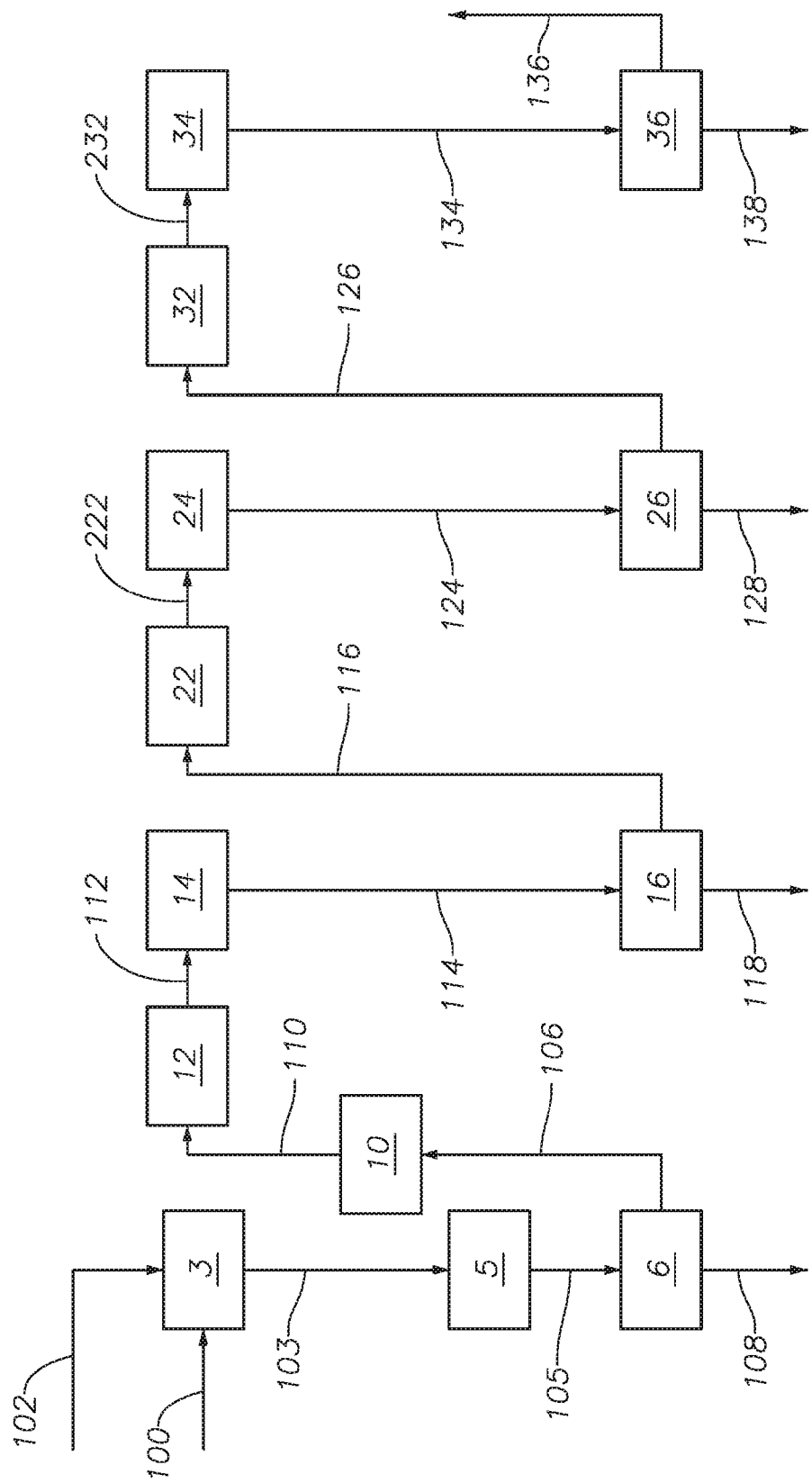
FIG. 4 is a process flow diagram of the process of the present invention including one adsorber.

Example 1-1 is a HYSYS simulation according to FIG. 4, a system having one adsorber immediately downstream of sulfur condenser 6. First adsorber 10 removed 78.2 kgmol/hr (1409.0 kg/hr) of water from first gas stream 106. First reheater 12 increased the temperature of first dry gas stream 110 to a temperature of 235° C. to produce first hot dry gas stream 112. Second reheater 22 increased the temperature of second gas stream 116 to a temperature of 215° C. to produce first hot wet gas stream 222. Third reheater 32 increased the temperature of third gas stream 126 to a temperature of 205° C. to produce second hot wet gas stream 232. The total sulfur recovered was 3193.0 kg/hr for a total conversion of sulfur of 99.6 wt %.

TABLE 2

Stream Properties and results in Example 1-1

| | Stream No. | | | | | | | | | |
|---|---|---|---|---|---|---|---|---|---|---|
| | 103 | 105 | 106 | 110 | 114 | 116 | 124 | 126 | 134 | 136 |
| Temperature | 979.0 | 315.0 | 100.0 | | 352.1 | 176.0 | 233.6 | 149.0 | 207.2 | 132.0 |
| Flow rate, kgmol/hr | 342.4 | 342.4 | 309.0 | 230.7 | 225.6 | 221.4 | 220.7 | 220.1 | 220.1 | 220.0 |
| Flow rate, kg/hr | 10720.0 | 1072.0 | 8558.0 | 7148.0 | 7148.0 | 6252.0 | 6252.0 | 6252.0 | 6129.0 | 6115.0 |
| Component flow rate, kmol/hr | | | | | | | | | | |
| $H_2S$ | 21.7612 | 21.7612 | 21.7612 | 21.7612 | 3.1313 | 3.1313 | 0.5853 | 0.5853 | 0.2852 | 0.2852 |
| $SO_2$ | 10.8806 | 10.8806 | 10.8806 | 10.8806 | 1.5657 | 1.5657 | 0.2957 | 0.2957 | 0.1526 | 0.1526 |
| $H_2O$ | 78.2 | 78.2 | 78.2 | 0.0 | 18.6 | 18.6 | 21.2 | 21.2 | 21.5 | 21.5 |
| $CO_2$ | 10.0 | 10.0 | 10.0 | | 10.0 | 10.0 | 10.0 | 10.0 | 10.0 | 10.0 |
| $N_2$ | 188.1 | 188.1 | 188.1 | | 188.1 | 188.1 | 188.1 | 188.1 | 188.1 | 188.1 |
| $S_2$ | 33.0752 | 33.0752 | 0.0000 | | 0.2448 | 0.0 | 0.0017 | 0.000 | 0.0003 | 0.000 |
| $S_3$ | 0.0 | 0.0000 | 0.0000 | | 0.0266 | 0.0 | 0.0001 | 0.000 | 0.0000 | 0.000 |
| $S_4$ | 0.3829 | 0.3829 | 0.0000 | | 0.0169 | 0.0 | 0.0001 | 0.000 | 0.0000 | 0.000 |
| $S_5$ | 0.0146 | 0.0145 | 0.0000 | | 0.1259 | 0.0 | 0.0061 | 0.000 | 0.0009 | 0.000 |
| $S_6$ | 0.0001 | 0.0001 | 0.0000 | | 1.3214 | 0.0 | 0.1236 | 0.000 | 0.0172 | 0.000 |
| $S_7$ | 0.0000 | 0.0000 | 0.0000 | | 0.7929 | 0.0 | 0.0630 | 0.000 | 0.0068 | 0.000 |
| $S_8$ | 0.0000 | 0.0000 | 0.0000 | | 1.6503 | 0.0 | 0.3252 | 0.000 | 0.0368 | 0.000 |
| Total sulfur, kg/hr | | | 2160.0 | | | 896.1 | | 122.5 | | 14.4 |
| Conversion of $H_2S$, wt % | 67.4 | | | | | 95.3 | | 99.1 | | 99.6 |

Figure 5:
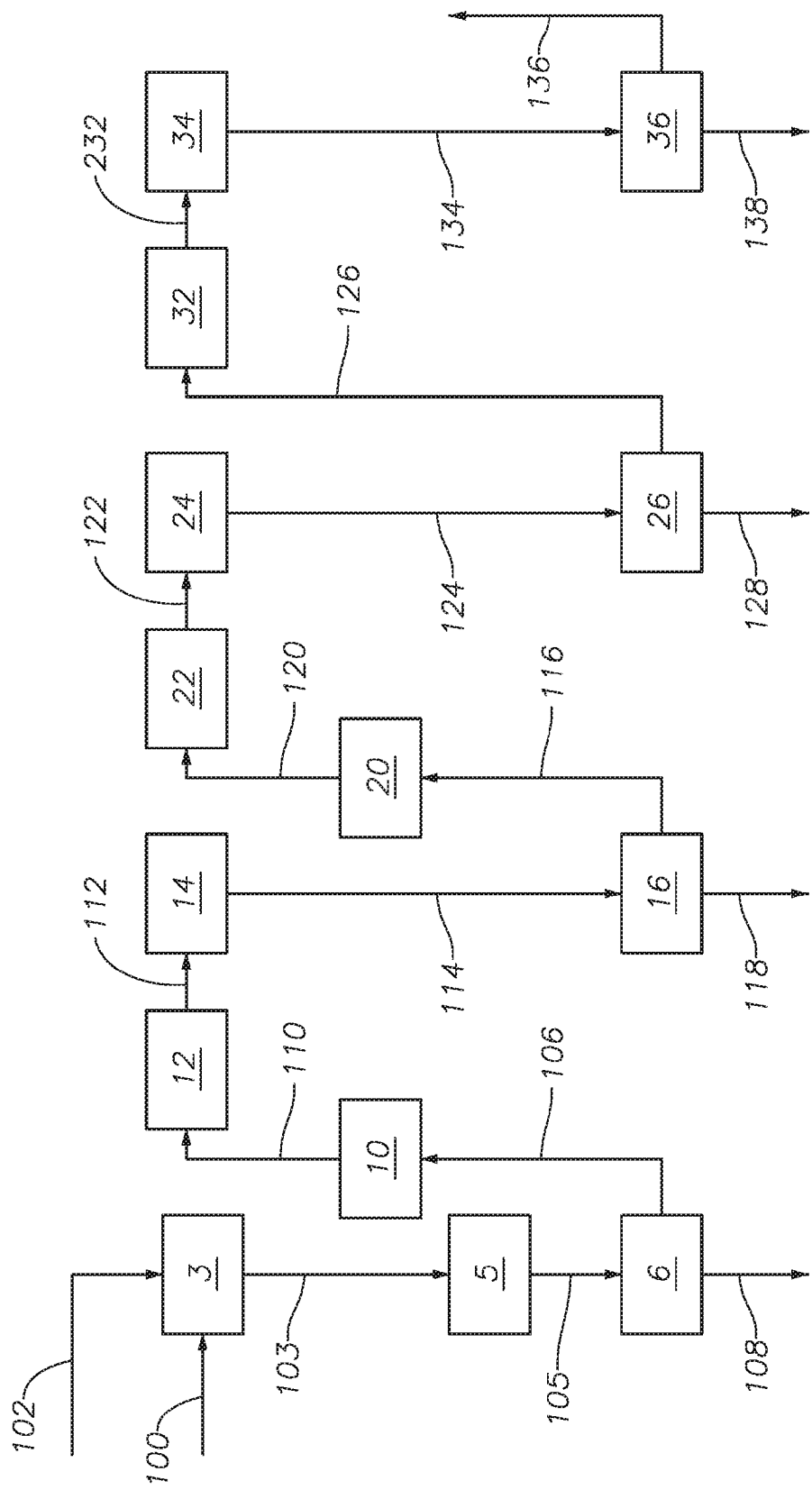
FIG. 5 is a process flow diagram of the process of the present invention including two adsorbers.

Example 1-2 is a HYSYS simulation according to FIG. 5, a system having two adsorbers. First adsorber 10 removed 78.2 kgmol/hr (1409.0 kg/hr) of water from first gas stream 106. First reheater 12 increased the temperature of first dry gas stream 110 to a temperature of 235° C. to produce first hot dry gas stream 112. Second adsorber 20 removed 18.6 kgmol/hr (335.6 kg/hr) of water from second gas stream 116. Second reheater 22 increased the temperature of second dry gas stream 120 to a temperature of 215° C. to produce second hot dry gas stream 122. Third reheater 32 increased the temperature of third gas stream 126 to a temperature of 205° C. to produce first hot wet gas stream 232. The total sulfur recovered was 3203.6.0 kg/hr for a total conversion of sulfur of 99.9 wt %.

TABLE 3

Stream properties in Example 1-2

| | Stream No. | | | | | | | | | | |
|---|---|---|---|---|---|---|---|---|---|---|---|
| | 103 | 105 | 106 | 110 | 114 | 116 | 120 | 124 | 126 | 134 | 136 |
| Temperature | 979.0 | 315.0 | 100.0 | | 352.1 | 100.0 | | 238.9 | 149.0 | 205.9 | 132.0 |
| Flow rate, kgmol/hr | 342.4 | 342.4 | 309.0 | 230.7 | 225.6 | 221.4 | 202.8 | 201.9 | 201.3 | 201.3 | 220.0 |
| Flow rate, kg/hr | 10720.0 | 1072.0 | 8558.0 | 7148.0 | 7148.0 | 6252.0 | 5916.0 | 5916.0 | 5774.0 | 5774.0 | 6115.0 |
| Component flow rate, kmol/hr | | | | | | | | | | | |
| $H_2S$ | 21.7612 | 21.7612 | 21.7612 | 21.7612 | 3.1313 | 3.1313 | 3.1313 | 0.1716 | 0.1716 | 0.0649 | 0.0649 |
| $SO_2$ | 10.8806 | 10.8806 | 10.8806 | 10.8806 | 1.5657 | 1.5657 | 1.5657 | 0.0858 | 0.0858 | 0.0325 | 0.0325 |
| $H_2O$ | 78.2 | 78.2 | 78.2 | 0.0 | 18.6 | 18.6 | 0.0000 | 3.0 | 3.0 | 3.0 | 3.0 |
| $CO_2$ | 10.0 | 10.0 | 10.0 | | 10.0 | 10.0 | 0.0000 | 10.0 | 10.0 | 10.0 | 10.0 |
| $N_2$ | 188.1 | 188.1 | 188.1 | | 188.1 | 188.1 | 0.0000 | 188.1 | 188.1 | 188.1 | 188.1 |
| $S_2$ | 33.0752 | 33.0752 | 0.0000 | 0.0000 | 0.2448 | 0.0 | 0.0000 | 0.0021 | 0.000 | 0.0002 | 0.000 |
| $S_3$ | 0.0 | 0.0000 | 0.0000 | 0.0000 | 0.0266 | 0.0 | 0.0000 | 0.0002 | 0.000 | 0.0000 | 0.000 |
| $S_4$ | 0.3829 | 0.3829 | 0.0000 | 0.0000 | 0.0169 | 0.0 | 0.0000 | 0.0001 | 0.000 | 0.0000 | 0.000 |
| $S_5$ | 0.0146 | 0.0145 | 0.0000 | 0.0000 | 0.1259 | 0.0 | 0.0000 | 0.0072 | 0.000 | 0.0004 | 0.000 |
| $S_6$ | 0.0001 | 0.0001 | 0.0000 | 0.0000 | 1.3214 | 0.0 | 0.0000 | 0.1437 | 0.000 | 0.0074 | 0.000 |
| $S_7$ | 0.0000 | 0.0000 | 0.0000 | 0.0000 | 0.7929 | 0.0 | 0.0000 | 0.0752 | 0.000 | 0.0025 | 0.000 |
| $S_8$ | 0.0000 | 0.0000 | 0.0000 | 0.0000 | 1.6503 | 0.0 | 0.0000 | 0.3761 | 0.000 | 0.0121 | 0.000 |
| Total sulfur, kg/hr | | | 2160.0 | | | 896.1 | | | 142.4 | | 5.1 |
| Conversion of $H_2S$, wt % | 67.4 | | | | 95.3 | | | | 99.7 | | 99.9 |

Example 1-3 is a HYSYS simulation according to FIG. 1, a system having three adsorbers. Adsorber 10 removed 78.2 kgmol/hr (1409.0 kg/hr) of water from first gas stream 106. First reheater 12 increased the temperature of first dry gas stream 110 to a temperature of 235° C. to produce first hot dry gas stream 112. Second adsorber 20 removed 18.6 kgmol/hr (335.6 kg/hr) of water from second gas stream 116. Second reheater 22 increased the temperature of second dry gas stream 120 to a temperature of 215° C. to produce second hot dry gas stream 122. Third adsorber 30 produced 3.0 kgmol/hr (53.3 kg/hr) of water from third gas stream 126. Third reheater 32 increased the temperature of third gas stream 126 to a temperature of 205° C. to produce third hot dry gas stream 132. The total sulfur recovered was 3206.3.0 kg/hr for a total conversion of sulfur of 100.0 wt %.

TABLE 4

Stream properties in Example 1-3

| | Stream No. | | | | | |
|---|---|---|---|---|---|---|
| | 103 | 105 | 106 | 110 | 114 | 116 |
| Temperature | 979.0 | 315.0 | 100.0 | 100.0 | 352.1 | 100.0 |
| Flow rate, kgmol/hr | 342.4 | 342.4 | 309.0 | 230.7 | 225.6 | 221.4 |
| Flow rate, kg/hr | 10720.0 | 1072.0 | 8558.0 | 7148.0 | 7148.0 | 6252.0 |
| Component flow rate, kmol/hr | | | | | | |
| $H_2S$ | 21.7612 | 21.7612 | 21.7612 | 21.7612 | 3.1313 | 3.1313 |
| $SO_2$ | 10.8806 | 10.8806 | 10.8806 | 10.8806 | 1.5657 | 1.5657 |
| $H_2O$ | 78.2 | 78.2 | 78.2 | 0.0 | 18.6 | 18.6 |
| $CO_2$ | 10.0 | 10.0 | 10.0 | | 10.0 | 10.0 |
| $N_2$ | 188.1 | 188.1 | 188.1 | | 188.1 | 188.1 |
| $S_2$ | 33.0752 | 33.0752 | 0.0000 | | 0.2448 | 0.0 |

TABLE 4-continued

Stream properties in Example 1-3

| | | | | | | |
|---|---|---|---|---|---|---|
| $S_3$ | 0.0 | 0.0000 | 0.0000 | | 0.0266 | 0.0 |
| $S_4$ | 0.3829 | 0.3829 | 0.0000 | | 0.0169 | 0.0 |
| $S_5$ | 0.0146 | 0.0145 | 0.0000 | | 0.1259 | 0.0 |
| $S_6$ | 0.0001 | 0.0001 | 0.0000 | | 1.3214 | 0.0 |
| $S_7$ | 0.0000 | 0.000 | 0.0000 | | 0.7929 | 0.0 |
| $S_8$ | | | | | 1.6503 | 0.0 |
| Total sulfur, kg/hr | | | 2160.0 | | | 896.1 |
| Conversion of $H_2S$, wt % | 67.4 | | | | 95.3 | |

| | Stream No. | | | | | |
|---|---|---|---|---|---|---|
| | 120 | 124 | 126 | 130 | 134 | 136 |
| Temperature | 100.0 | 238.9 | 100.0 | 100.0 | 206.3 | 132.0 |
| Flow rate, kgmol/hr | 202.8 | 201.9 | 201.3 | 198.4 | 198.3 | 198.3 |
| Flow rate, kg/hr | 5916.0 | 5916.0 | 5774.0 | 5721.0 | 5721.0 | 5713.0 |
| Component flow rate, kmol/hr | | | | | | |
| $H_2S$ | 3.1313 | 0.1716 | 0.1716 | 0.1716 | 0.0097 | 0.0649 |
| $SO_2$ | 1.5657 | 0.0858 | 0.0858 | 0.0858 | 0.0049 | 0.0049 |
| $H_2O$ | 0.0000 | 3.0 | 3.0 | | 0.2 | 0.2 |
| $CO_2$ | 0.0000 | 10.0 | 10.0 | | 10.0 | 10.0 |
| $N_2$ | 0.0000 | 188.1 | 188.1 | | 188.1 | 188.1 |
| $S_2$ | 0.0000 | 0.0021 | 0.000 | | 0.0002 | 0.000 |
| $S_3$ | 0.0000 | 0.0002 | 0.000 | | 0.0000 | 0.000 |
| $S_4$ | 0.0000 | 0.0001 | 0.000 | | 0.0000 | 0.000 |
| $S_5$ | 0.0000 | 0.0072 | 0.000 | | 0.0005 | 0.000 |
| $S_6$ | 0.0000 | 0.1437 | 0.000 | | 0.0101 | 0.000 |
| $S_7$ | 0.0000 | 0.0752 | 0.000 | | 0.0037 | 0.000 |
| $S_8$ | 0.0000 | 0.3761 | 0.000 | | 0.0191 | 0.000 |
| Total sulfur, kg/hr | | 142.4 | | | | 7.8 |
| Conversion of $H_2S$, wt % | | 99.7 | | | 100.0 | |

Figure 6:
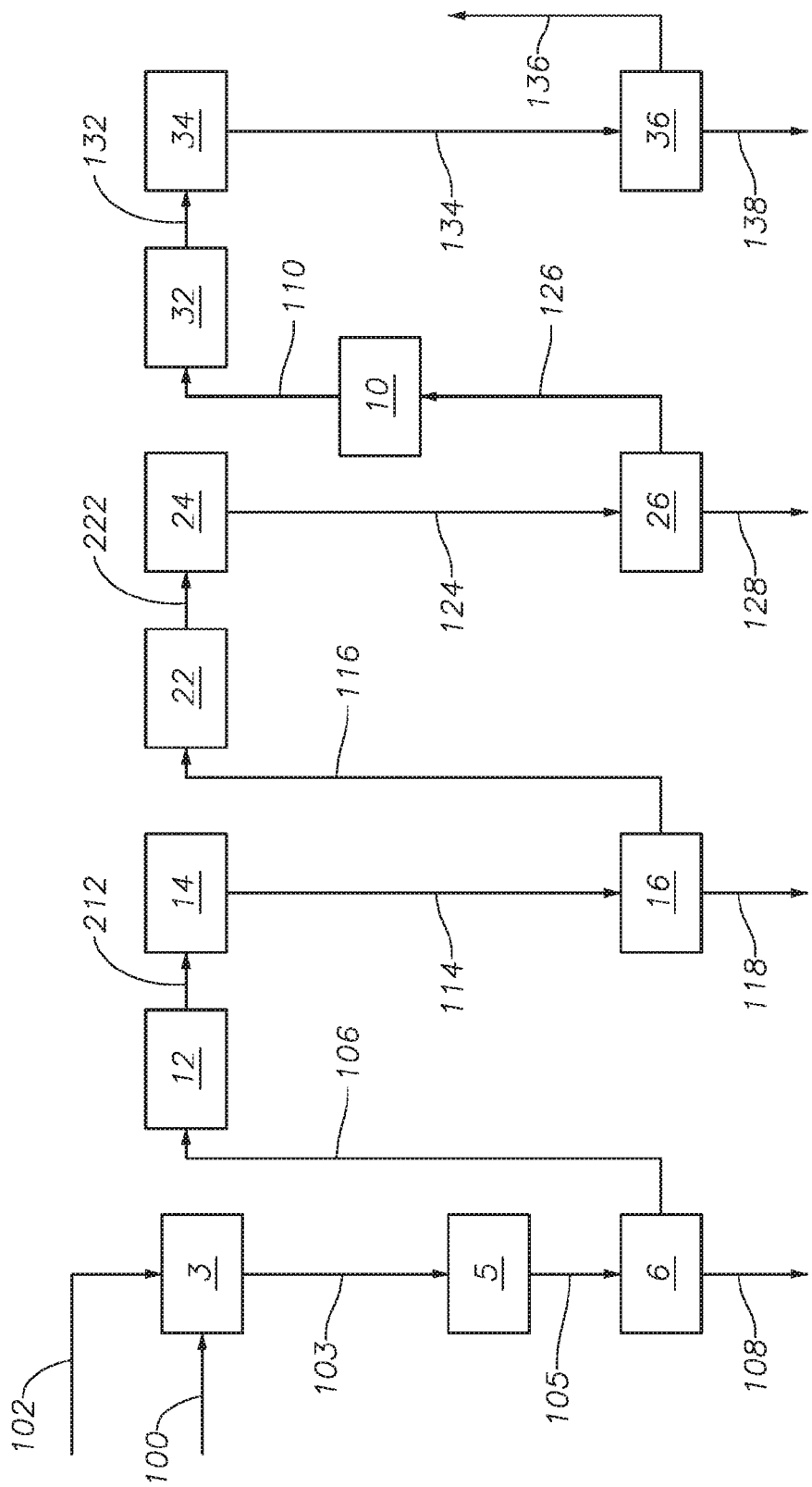
FIG. 6 is a process flow diagram of the process of the present invention including one adsorber.

Example 1-4 is a HYSYS simulation according to FIG. 6 having one adsorber upstream of the final Claus catalytic stage. First reheater 12 increased the temperature of first gas stream 106 to a temperature of 235° C. to produce first hot wet gas stream 212. Second reheater 22 increased the temperature of second gas stream 116 to a temperature of 215° C. to produce second hot wet gas stream 222. First adsorber 10 removed 98.1 kgmol/hr (1767.0 kg/hr) of water from third gas stream 126. Third reheater 32 increased the temperature of first dry gas stream 110 to a temperature of 205° C. to produce first hot dry gas stream 132. The total sulfur recovered was 3202.6 kg/hr for a total conversion of 99.9 wt %.

TABLE 5

Stream properties in Example 1-4

| | Stream No. | | | | | | | | | |
|---|---|---|---|---|---|---|---|---|---|---|
| | 103 | 105 | 106 | 114 | 116 | 124 | 126 | 130 | 134 | 136 |
| Temperature | 979.0 | 315.0 | 190.0 | 309.6 | 176.0 | 236.3 | 100.0 | 100.0 | 220.2 | 132.0 |
| Flow rate, kgmol/hr | 342.4 | 342.4 | 309.0 | 304.5 | 301.1 | 299.9 | 299.1 | 201.0 | 200.4 | 298.6 |
| Flow rate, kg/hr | 10720.0 | 1072.0 | 8558.0 | 8558.0 | 7802.0 | 7802.0 | 7603.0 | 5837.0 | 5837.0 | 7560.0 |
| Component flow rate, kmol/hr | | | | | | | | | | |
| $H_2S$ | 21.7612 | 21.7612 | 21.7612 | 6.0443 | 6.0443 | 1.9240 | 1.9240 | 1.9240 | 0.0866 | 1.0185 |
| $SO_2$ | 10.8806 | 10.8806 | 10.8806 | 3.0221 | 3.0221 | 0.9620 | 0.9620 | 0.9620 | 0.0433 | 0.5092 |
| $H_2O$ | 78.2 | 78.2 | 78.2 | 94.0 | 94.0 | 98.1 | 98.1 | 0.0000 | 1.8 | 99.0 |
| $CO_2$ | 10.0 | 10.0 | 10.0 | 10.0 | 10.0 | 10.0 | 10.0 | | 10.0 | 10.0 |
| $N_2$ | 188.1 | 188.1 | 188.1 | 188.1 | 188.1 | 188.1 | 188.1 | | 188.1 | 188.1 |
| $S_2$ | 33.0752 | 33.0752 | 0.0000 | 0.0741 | 0.0 | 0.0027 | 0.000 | | 0.0007 | 0.000 |
| $S_3$ | 0.0 | 0.0000 | 0.0000 | 0.0078 | 0.0 | 0.0002 | 0.000 | | 0.0001 | 0.000 |
| $S_4$ | 0.3829 | 0.3829 | 0.0000 | 0.0052 | 0.0 | 0.0002 | 0.000 | | 0.0000 | 0.000 |
| $S_5$ | 0.0146 | 0.0145 | 0.0000 | 0.0752 | 0.0 | 0.0098 | 0.000 | | 0.0037 | 0.000 |
| $S_6$ | 0.0001 | 0.0001 | 0.0000 | 0.9895 | 0.0 | 0.1980 | 0.000 | | 0.0824 | 0.000 |

TABLE 5-continued

Stream properties in Example 1-4

| | Stream No. | | | | | | | | | |
|---|---|---|---|---|---|---|---|---|---|---|
| | 103 | 105 | 106 | 114 | 116 | 124 | 126 | 130 | 134 | 136 |
| $S_7$ | 0.0000 | 0.000 | 0.0000 | 0.5772 | 0.0 | 0.1081 | 0.000 | | 0.0412 | 0.000 |
| $S_8$ | | | | 1.6286 | 0.0 | 0.5269 | 0.000 | | 0.2441 | 0.000 |
| Total sulfur, kg/hr | | | 2160.0 | | 756.0 | | 198.2 | | | 88.4 |
| Conversion of $H_2S$, wt % | 67.4 | | | 90.9 | | 97.1 | | | 99.9 | |

The results of Examples 1 through 1-4 indicate that the adsorbers increase the conversion of sulfur in the catalytic reactors. Table 6 is a comparison of the results. Having even one adsorber to remove water from the process increases the conversion by at least 1% over the system in Example 1 that had no adsorbers.

TABLE 6

Comparison of sulfur conversion

| | | | Conversion % | | | | |
|---|---|---|---|---|---|---|---|
| Ex. | # of Adsorbers | FIG. # | Combustion Furnace | Catalytic Reactor | Catalytic Reactor | Catalytic Reactor | Overall | Kg sulfur/100 mol $H_2S$ |
| 1 | None | 3 | 67.4 | 90.9 | 97.1 | 98.5 | 98.5 | 3158 |
| 1-1 | One | 4 | 67.4 | 95.3 | 99.1 | 99.6 | 99.6 | 3193 |
| 1-2 | Two | 5 | 67.4 | 95.3 | 99.7 | 99.9 | 99.9 | 3203 |
| 1-3 | Three | 1 | 67.4 | 95.3 | 99.7 | 100.0 | 100.0 | 3206 |
| 1-4 | One | 6 | 67.4 | 90.9 | 97.1 | 99.9 | 99.9 | 3203 |

Example 2

Example 2, a comparative example, is a HYSYS simulation according to FIG. 2, a process flow diagram of a conventional Claus process, including two catalytic reactors: first catalytic reactor 14 and second catalytic reactor 24. First reheater 12 increased the temperature of first gas stream 106 to a temperature of 235° C. to produce first hot wet gas stream 212. Second reheater 22 increased the temperature of second gas stream 116 to a temperature of 205° C. to produce second hot wet gas stream 222. The total sulfur recovered was 3157.8 kg/hr for a total conversion of 97.5 wt %.

TABLE 7

Stream properties and results for Example 2

| | Stream No. | | | | | | |
|---|---|---|---|---|---|---|---|
| | 103 | 105 | 106 | 114 | 116 | 124 | 136 |
| Temperature | 979.0 | 315.0 | 190.0 | 309.6 | 176.0 | 227.7 | 132.0 |
| Flow rate, kgmol/hr | 342.4 | 342.4 | 309.0 | 304.5 | 301.1 | 299.8 | 298.9 |
| Flow rate, kg/hr | 10720.0 | 1072.0 | 8558.0 | 8558.0 | 7802.0 | 7802.0 | 7592.0 |
| Component flow rate, kmol/hr | | | | | | | |
| $H_2S$ | 21.7612 | 21.7612 | 21.7612 | 6.0443 | 6.0443 | 1.6918 | 1.6918 |
| $O_2$ | | | | | | | |
| $SO_2$ | 10.8806 | 10.8806 | 10.8806 | 3.0221 | 3.0221 | 0.8459 | 0.8459 |
| $H_2O$ | 78.2 | 78.2 | 78.2 | 94.0 | 94.0 | 98.3 | 98.3 |
| $CO_2$ | 10.0 | 10.0 | 10.0 | 10.0 | 10.0 | 10.0 | 10.0 |
| $N_2$ | 188.1 | 188.1 | 188.1 | 188.1 | 188.1 | 188.1 | 188.1 |
| $S_2$ | 33.0752 | 33.0752 | 0.0000 | 0.0741 | 0.0 | 0.0018 | 0.000 |
| $S_3$ | 0.0 | 0.0000 | 0.0000 | 0.0078 | 0.0 | 0.0002 | 0.000 |
| $S_4$ | 0.3829 | 0.3829 | 0.0000 | 0.0052 | 0.0 | 0.0001 | 0.000 |
| $S_5$ | 0.0146 | 0.0145 | 0.0000 | 0.0752 | 0.0 | 0.0087 | 0.000 |
| $S_6$ | 0.0001 | 0.0001 | 0.0000 | 0.9895 | 0.0 | 0.1917 | 0.000 |

TABLE 7-continued

Stream properties and results for Example 2

| | Stream No. | | | | | | |
|---|---|---|---|---|---|---|---|
| | 103 | 105 | 106 | 114 | 116 | 124 | 136 |
| $S_7$ | 0.0000 | 0.000 | 0.0000 | 0.5772 | 0.0 | 0.1011 | 0.000 |
| $S_8$ | | | | 1.6286 | 0.0 | 0.5782 | 0.000 |
| Total sulfur, kg/hr | | | 2160.0 | | 756.0 | | 209.3 |
| Conversion of $H_2S$, | 67.4 | | | 90.9 | | 97.5 | |

Figure 7:
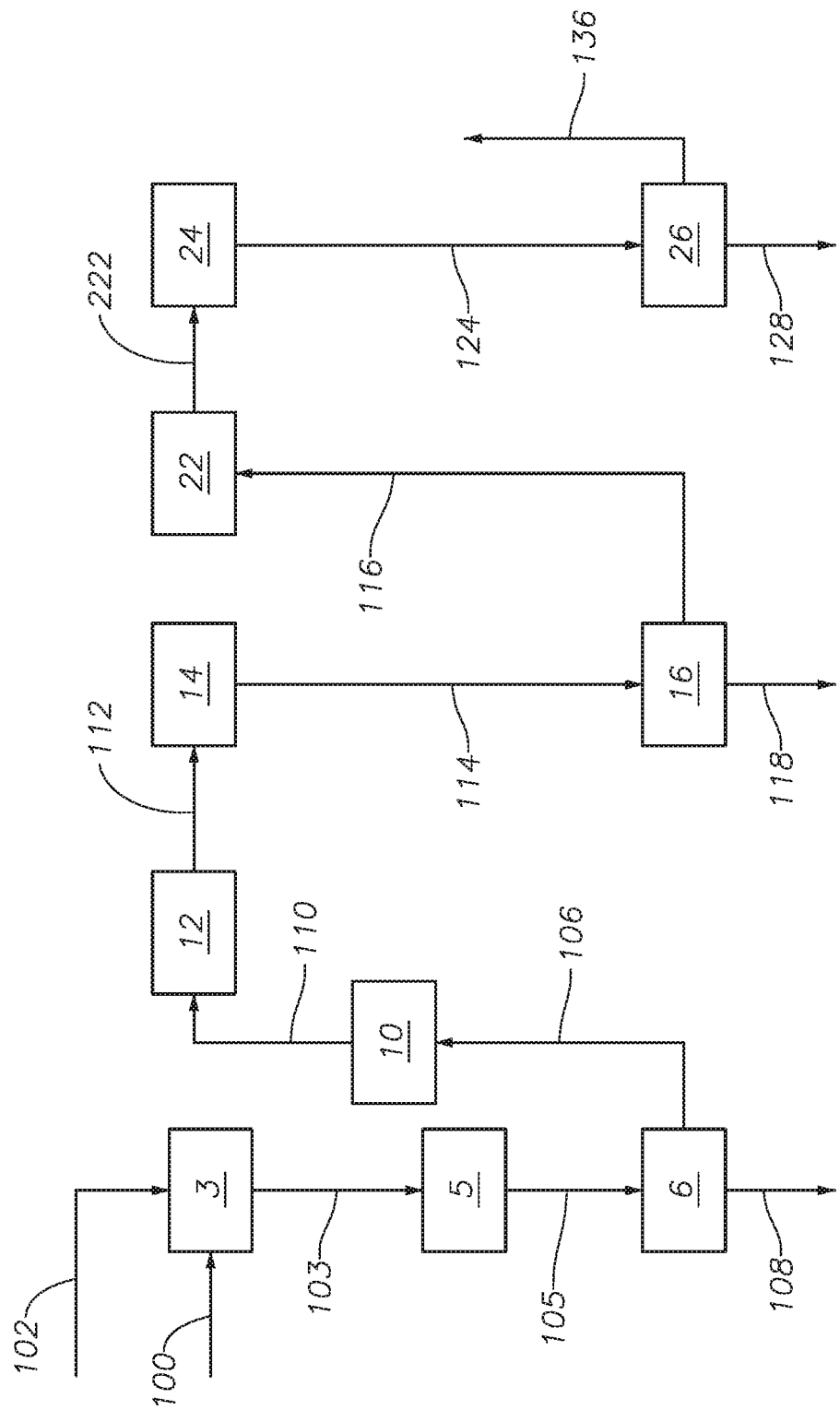
FIG. 7 is a process flow diagram of the process of the present invention including one adsorber.

Example 2-1 is a HYSYS simulation according to FIG. 7 having one adsorber upstream of the first Claus catalytic stage. First adsorber 10 removed 78.2 kgmol/hr (1409.0 kg/hr) of water from first gas stream 106. First reheater 12 increased the temperature of first dry gas stream 110 to a temperature of 235° C. to produce first hot dry gas stream 112. Second reheater 22 increased the temperature of second gas stream 116 to a temperature of 205° C. to produce first hot wet gas stream 222. The total sulfur recovered was 3281.3 kg/hr for a total conversion of 99.2 wt %.

TABLE 8

Stream properties and results for Example 2-1

| | Stream No. | | | | | | | |
|---|---|---|---|---|---|---|---|---|
| | 103 | 105 | 106 | 110 | 114 | 116 | 124 | 136 |
| Temperature (° C.) | 979.0 | 315.0 | 100.0 | | 352.1 | 176.0 | 224.6 | 132.0 |
| Flow rate, kgmol/hr | 342.4 | 342.4 | 309.0 | 230.7 | 225.6 | 221.4 | 220.1 | 220.1 |
| Flow rate, kg/hr | 10720.0 | 1072.0 | 8558.0 | 7148.0 | 7148.0 | 6252.0 | 6252.0 | 6126.0 |
| Component flow rate, kmol/hr | | | | | | | | |
| $H_2S$ | 21.7612 | 21.7612 | 21.7612 | 21.7612 | 3.1313 | 3.1313 | 0.5072 | 0.5072 |
| $SO_2$ | 10.8806 | 10.8806 | 10.8806 | 10.8806 | 1.5657 | 1.5657 | 0.2536 | 0.2536 |
| $H_2O$ | 78.2 | 78.2 | 78.2 | 0.0 | 18.6 | 18.6 | 21.3 | 21.3 |
| $CO_2$ | 10.0 | 10.0 | 10.0 | | 10.0 | 10.0 | 10.0 | 10.0 |
| $N_2$ | 188.1 | 188.1 | 188.1 | | 188.1 | 188.1 | 188.1 | 188.1 |
| $S_2$ | 33.0752 | 33.0752 | 0.0000 | | 0.2448 | 0.0 | 0.0011 | 0.000 |
| $S_3$ | 0.0 | 0.0000 | 0.0000 | | 0.0266 | 0.0 | 0.0001 | 0.000 |
| $S_4$ | 0.3829 | 0.3829 | 0.0000 | | 0.0169 | 0.0 | 0.0001 | 0.000 |
| $S_5$ | 0.0146 | 0.0145 | 0.0000 | | 0.1259 | 0.0 | 0.0052 | 0.000 |
| $S_6$ | 0.0001 | 0.0001 | 0.0000 | | 1.3214 | 0.0 | 0.1163 | 0.000 |
| $S_7$ | 0.0000 | 0.000 | 0.0000 | | 0.7929 | 0.0 | 0.0600 | 0.000 |
| $S_8$ | | | | | 1.6503 | 0.0 | 0.3487 | 0.000 |
| Total sulfur, kg/hr | | | 2160.0 | | | 896.1 | | 225.2 |
| Conversion $H_2S$, wt % | 67.4 | | | | 95.3 | | 99.2 | |

Figure 8:
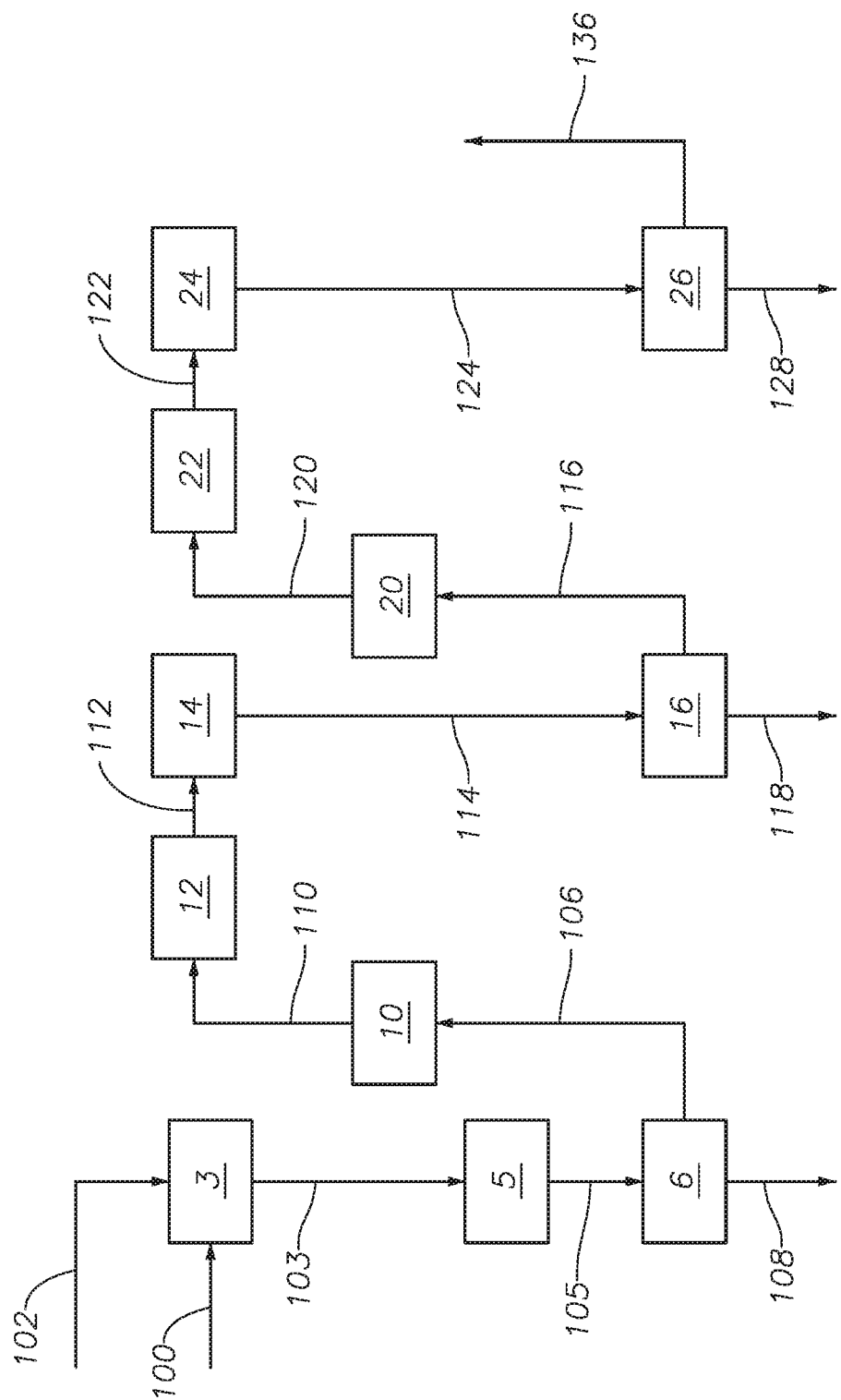
FIG. 8 is a process flow diagram of the process of the present invention including two adsorber.

Example 2-2 is a HYSYS simulation according to FIG. 8 having two adsorbers. First adsorber 10 removed 78.2 kgmol/hr (1409.0 kg/hr) of water from first gas stream 106. First reheater 12 increased the temperature of first dry gas stream 110 to a temperature of 235° C. to produce first hot dry gas stream 112. Second adsorber 20 removed 18.6 kgmol/hr (335.6 kg/hr) of water from second gas stream 116. Second reheater 22 increased the temperature of second dry gas stream 120 to a temperature of 205° C. to produce second hot dry gas stream 122. The total sulfur recovered was 3199.6 kg/hr for a total conversion of 99.8 wt %.

TABLE 9

Stream properties and results for Example 2-2

| | Stream No. | | | | | | | | |
|---|---|---|---|---|---|---|---|---|---|
| | 103 | 105 | 106 | 110 | 114 | 116 | 120 | 124 | 136 |
| Temperature | 979.0 | 315.0 | 100.0 | | 352.1 | 100.0 | | 229.3 | 132.0 |
| Flow rate, kgmol/hr | 342.4 | 342.4 | 309.0 | 230.7 | 225.6 | 221.4 | 202.8 | 201.9 | 201.3 |
| Flow rate, kg/hr | 10720.0 | 1072.0 | 8558.0 | 7148.0 | 7148.0 | 6252.0 | 5916.0 | 5916.0 | 5773.0 |
| Component flow rate, kmol/hr | | | | | | | | | |
| $H_2S$ | 21.7612 | 21.7612 | 21.7612 | 21.7612 | 3.1313 | 3.1313 | 3.1313 | 0.1483 | 0.1483 |
| $SO_2$ | 10.8806 | 10.8806 | 10.8806 | 10.8806 | 1.5657 | 1.5657 | 1.5657 | 0.0742 | 0.0742 |
| $H_2O$ | 78.2 | 78.2 | 78.2 | 0.0 | 18.6 | 18.6 | 0.0000 | 3.0 | 3.0 |
| $CO_2$ | 10.0 | 10.0 | 10.0 | | 10.0 | 10.0 | 0.0000 | 10.0 | 10.0 |
| $N_2$ | 188.1 | 188.1 | 188.1 | | 188.1 | 188.1 | 0.0000 | 188.1 | 188.1 |
| $S_2$ | 33.0752 | 33.0752 | 0.0000 | | 0.2448 | 0.0 | 0.0000 | 0.0013 | 0.000 |
| $S_3$ | 0.0 | 0.0000 | 0.0000 | | 0.0266 | 0.0 | 0.0000 | 0.0001 | 0.000 |
| $S_4$ | 0.3829 | 0.3829 | 0.0000 | | 0.0169 | 0.0 | 0.0000 | 0.0001 | 0.000 |
| $S_5$ | 0.0146 | 0.0145 | 0.0000 | | 0.1259 | 0.0 | 0.0000 | 0.0061 | 0.000 |
| $S_6$ | 0.0001 | 0.0001 | 0.0000 | | 1.3214 | 0.0 | 0.0000 | 0.1351 | 0.000 |
| $S_7$ | 0.0000 | 0.000 | 0.0000 | | 0.7929 | 0.0 | 0.0000 | 0.0701 | 0.000 |
| $S_8$ | | | | | 1.6503 | 0.0 | 0.0000 | 0.3943 | 0.000 |
| Total sulfur, kg/hr | | | 2160.0 | | | 896.1 | | | 143.5 |
| Conversion of $H_2S$, | 67.4 | | | | 95.3 | | | 99.8 | |

Figure 9:
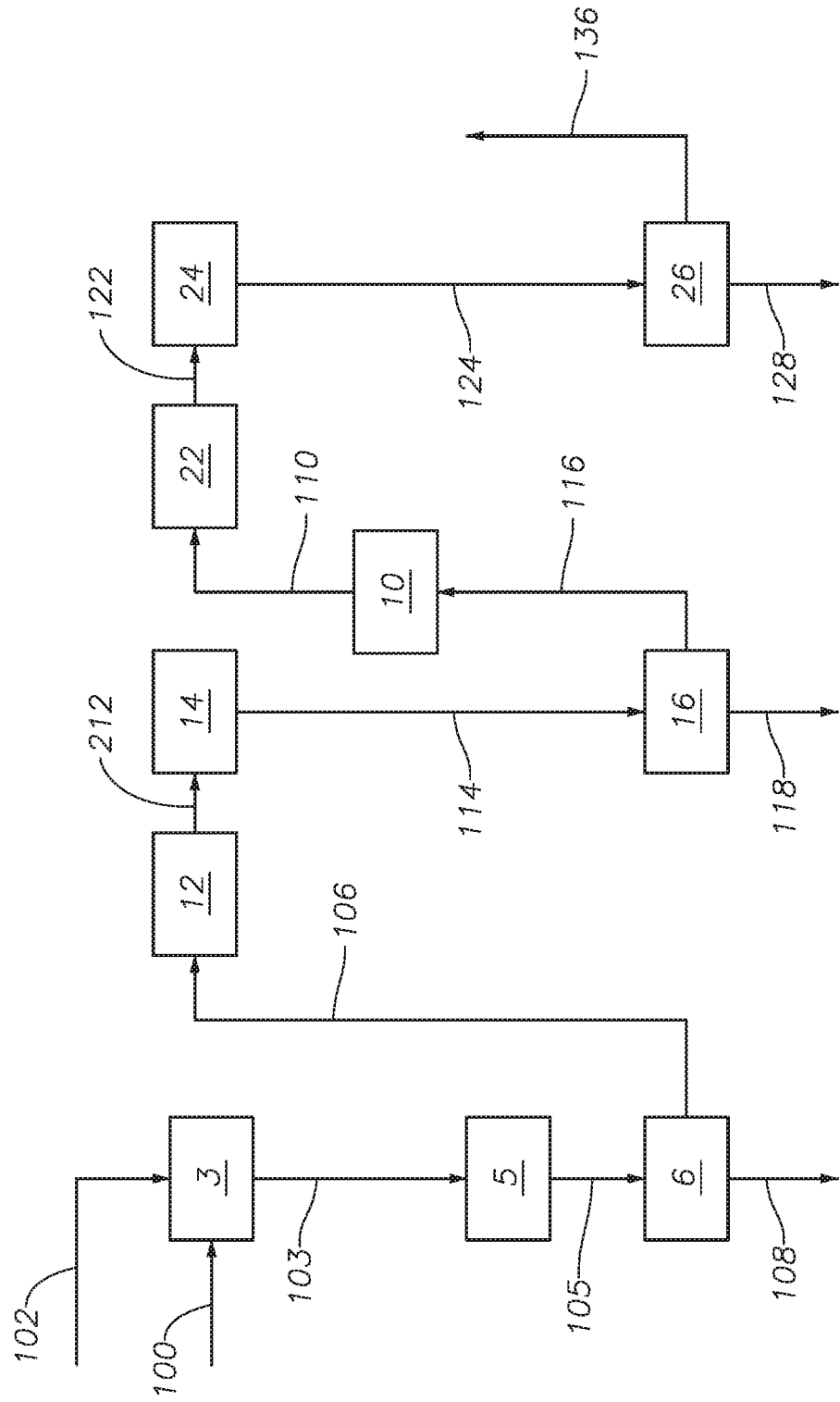
FIG. 9 is a process flow diagram of the process of the present invention including one adsorbers.

Example 2-3 is a HYSYS simulation according to FIG. 9 having one adsorber upstream of the final Claus catalytic stage. First reheater 12 increased the temperature of first gas stream 106 to a temperature of 235° C. to produce hot wet gas stream 212. Adsorber 10 removed 94.0 kgmol/hr (1693.0 kg/hr) of water from second gas stream 116. Second reheater 22 increased the temperature of dry gas stream 110 to a temperature of 205° C. to produce hot dry gas stream 122. The total sulfur recovered was 3190.2 kg/hr for a total conversion of 99.5 wt %.

TABLE 10

Stream properties and results for Example 2-3

| | 103 | 105 | 106 | 114 | 116 | 110 | 124 | 136 |
|---|---|---|---|---|---|---|---|---|
| Temperature | 979.0 | 315.0 | 190.0 | 309.6 | 100.0 | 100.0 | 249.8 | 132.0 |
| Flow rate, kgmol/hr | 342.4 | 342.4 | 309.0 | 304.5 | 301.1 | 94.0 | 205.5 | 201.3 |
| Flow rate, kg/hr | 10720.0 | 1072.0 | 8558.0 | 8558.0 | 7802.0 | 1693.0 | 6109.0 | 5773.0 |
| Component flow rate, kmol/hr | | | | | | | | |
| $H_2S$ | 21.7612 | 21.7612 | 21.7612 | 6.0443 | 6.0443 | 6.0443 | 0.3429 | 0.3429 |
| $SO_2$ | 10.8806 | 10.8806 | 10.8806 | 3.0221 | 3.0221 | 3.0221 | 0.1714 | 0.1714 |
| $H_2O$ | 78.2 | 78.2 | 78.2 | 94.0 | 94.0 | 0.0000 | 5.7 | 5.7 |
| $CO_2$ | 10.0 | 10.0 | 10.0 | 10.0 | 10.0 | 0.000 | 10.0 | 10.0 |
| $N_2$ | 188.1 | 188.1 | 188.1 | 188.1 | 188.1 | 0.000 | 188.1 | 188.1 |
| $S_2$ | 33.0752 | 33.0752 | 0.0000 | 0.0741 | 0.0 | 0.000 | 0.0041 | 0.000 |
| $S_3$ | 0.0 | 0.0000 | 0.0000 | 0.0078 | 0.0 | 0.000 | 0.0004 | 0.000 |
| $S_4$ | 0.3829 | 0.3829 | 0.0000 | 0.0052 | 0.0 | 0.000 | 0.0003 | 0.000 |
| $S_5$ | 0.0146 | 0.0145 | 0.0000 | 0.0752 | 0.0 | 0.000 | 0.0136 | 0.000 |
| $S_6$ | 0.0001 | 0.0001 | 0.0000 | 0.9895 | 0.0 | 0.000 | 0.2677 | 0.000 |
| $S_7$ | 0.0000 | 0.000 | 0.0000 | 0.5772 | 0.0 | 0.000 | 0.1513 | 0.000 |
| $S_8$ | | | | 1.6286 | 0.0 | 0.000 | 0.7261 | 0.000 |
| Total sulfur, kg/hr | | | 2160.0 | | 756.0 | | 274.2 | |
| Conversion of $H_2S$, | 67.4 | | | 90.9 | | | 99.5 | |

The results of Examples 2 through 2-3 indicate that the adsorbers increase the conversion of sulfur in the catalytic reactors. Table 11 is a comparison of the results. In a Claus process having two Claus catalytic stages, even one adsorber can increase the sulfur recovery, so that the Claus process can achieve greater than 99 wt % removal of sulfur.

TABLE 11

Comparison of sulfur conversion

| Ex. | # of Ad-sorbers | FIG. # | Com-bustion Furnace | Conversion % Catalytic Reactor | Catalytic Reactor | Over-all | Kg sulfur/ 100 mol H$_2$S |
|---|---|---|---|---|---|---|---|
| 2 | None | 7 | 67.4 | 90.9 | 97.5 | 97.5 | 3125 |
| 2-1 | One | 8 | 67.4 | 95.3 | 99.2 | 99.2 | 3182 |
| 2-2 | Two | 9 | 67.4 | 95.3 | 99.8 | 99.8 | 3199 |
| 2-3 | One | 10 | 67.4 | 90.9 | 99.5 | 99.5 | 3190 |

If the minimum requirement for hydrogen sulfide conversion is 99.5 wt %, all of the Examples using adsorbers achieve the minimum requirement except the two Claus catalytic stage with only one adsorber upstream of the first Claus catalytic stage. The Examples illustrate that the removal of water by adsorbers in addition to the removal of sulfur in the condensers increases the conversion in the Claus catalytic reactors.

Although embodiments have been described in detail, it should be understood that various changes, substitutions, and alterations can be made without departing from the principle and scope of the invention. Accordingly, the scope should be determined by the following claims and their appropriate legal equivalents.

The singular forms "a," "an," and "the" include plural referents, unless the context clearly dictates otherwise.

"Optional" or "optionally" means that the subsequently described event or circumstances can or may not occur. The description includes instances where the event or circumstance occurs and instances where it does not occur.

Ranges may be expressed throughout as from about one particular value to about another particular value. When such a range is expressed, it is to be understood that another embodiment is from the one particular value to the other particular value, along with all combinations within said range.

As used throughout and in the appended claims, the words "comprise," "has," and "include" and all grammatical variations thereof are each intended to have an open, non-limiting meaning that does not exclude additional elements or steps.

As used throughout, terms such as "first" and "second" are assigned based on the position of the unit in the flow path and are merely intended to differentiate between two or more of the same units in the system. It is to be understood that the words "first" and "second" serve no other purpose and are not part of the name or description of the component. Furthermore, it is to be understood that that the mere use of the term "first" and "second" does not require that there be any "third" component, although that possibility is contemplated under the scope.

What is claimed is:

1. A method to recover sulfur from hydrogen sulfide in an acid gas stream, the method comprising the steps of:
    feeding the acid gas stream to a combustion furnace to produce a furnace outlet stream, the combustion furnace configured to convert the hydrogen sulfide to elemental sulfur, wherein the furnace outlet stream comprises elemental sulfur, hydrogen sulfide, sulfur dioxide, and water vapor;
    introducing the furnace outlet stream to a waste heat boiler to produce a cooled furnace outlet stream, the waste heat boiler configured to reduce a temperature of the furnace outlet stream;
    condensing the cooled furnace stream in a sulfur condenser to produce a liquid sulfur stream and a first gas stream, the sulfur condenser configured to reduce a temperature of the cooled furnace stream to a temperature below a dew point of elemental sulfur and above a dew point of water;
    feeding the first gas stream to a first adsorber to produce a first dry gas stream and a first water stream, wherein the first adsorber comprises a molecular sieve, wherein the first dry gas stream is in the absence of water vapor, wherein the first dry gas stream comprises hydrogen sulfide and sulfur dioxide;
    heating the first dry gas stream in a first reheater to produce a first hot dry gas stream, wherein the first hot dry gas stream is at a first temperature;
    feeding the first hot dry gas stream to a first catalytic reactor to produce a first catalytic outlet stream, wherein the first catalytic outlet stream comprises elemental sulfur, hydrogen sulfide, sulfur dioxide, and water vapor;
    cooling the first catalytic outlet stream in a first condenser to produce a first sulfur stream and a second gas stream, the first condenser configured to condense the elemental sulfur in the first catalytic outlet stream such that the first sulfur stream comprises liquid sulfur, wherein a temperature in the first condenser is between the dew point of sulfur and the dew point of water, wherein the second gas stream comprises hydrogen sulfide, sulfur dioxide, and water vapor;
    feeding the second gas stream to a second adsorber to produce a second dry gas stream and a second water stream, wherein the second adsorber comprises a molecular sieve, wherein the second dry gas stream comprises hydrogen sulfide and sulfur dioxide, wherein the second dry gas stream is in the absence of water vapor;
    heating the second dry gas stream in a second reheater to produce a second hot dry gas stream, wherein the second hot dry gas stream is at a second temperature, wherein the second temperature is lower than the first temperature;
    feeding the second hot dry gas stream to a second catalytic reactor to produce a second catalytic outlet stream, wherein the second catalytic outlet stream comprises elemental sulfur, hydrogen sulfide, sulfur dioxide, and water vapor;
    cooling the second catalytic outlet stream in a second condenser to produce a second sulfur stream and a third gas stream, the second condenser configured to condense the elemental sulfur in the second catalytic outlet stream such that the second sulfur stream comprises liquid sulfur, wherein a temperature in the second condenser is between the dew point of sulfur and the dew point of water, wherein the third gas stream comprises hydrogen sulfide, sulfur dioxide, and water vapor;
    introducing the third gas stream to a third adsorber to produce a third dry gas stream and a third water stream, wherein the third adsorber comprises a molecular sieve, wherein the third dry gas stream comprises hydrogen sulfide and sulfur dioxide, wherein the third dry gas stream is in the absence of water vapor;
    heating the third dry gas stream in a third reheater to produce a third hot dry gas stream, wherein the third hot dry gas stream is at a third temperature, wherein the third temperature is lower than the second temperature;
    feeding the third hot dry gas stream to a third catalytic reactor to produce a third catalytic outlet stream, wherein the third catalytic outlet stream comprises elemental sulfur, hydrogen sulfide, sulfur dioxide, and water vapor; and
    cooling the third catalytic outlet stream in a third condenser to produce a third sulfur stream and a tail gas stream, the third condenser configured to condense the elemental sulfur in the third catalytic outlet stream such that the third sulfur stream comprises liquid sulfur, wherein a temperature in the third condenser is between the dew point of sulfur and the dew point of water, wherein the tail gas stream comprises hydrogen sulfide, sulfur dioxide, and water vapor.

2. The method of claim 1, wherein a total conversion can be determined.

3. The method of claim 2, wherein the total conversion exceeds 99% by weight.

4. The method of claim 1, wherein the molecular sieve is molecular sieve 3A.

5. The method of claim 1, wherein the first temperature is 235° C.

6. The method of claim 1, wherein the second temperature is 215° C.

7. The method of claim 1, wherein the third temperature is 205° C.

8. A system to recover sulfur from hydrogen sulfide in an acid gas stream, the system comprising:
- a combustion furnace, the combustion furnace configured to convert the hydrogen sulfide to elemental sulfur to produce a furnace outlet stream, wherein the furnace outlet stream comprises elemental sulfur, hydrogen sulfide, sulfur dioxide, and water vapor;
- a waste heat boiler fluidly connected to the combustion furnace, the waste heat boiler configured to remove heat from the furnace outlet stream to produce a cooled furnace stream;
- a sulfur condenser fluidly connected to the waste heat boiler, the sulfur condenser configured to condense the elemental sulfur in cooled furnace stream to produce a liquid sulfur stream and a first gas stream, wherein the gas stream is in the absence of elemental sulfur, wherein the first gas stream comprises water vapor;
- a first adsorber fluidly connected to the sulfur condenser, the first adsorber configured to remove water vapor from the first gas stream to produce a first dry gas stream and a first water stream, wherein the first adsorber comprises a molecular sieve, wherein the first dry gas stream comprises hydrogen sulfide and sulfur dioxide and is in the absence of water vapor;
- a first Claus catalytic stage fluidly connected to the first adsorber, the first Claus catalytic stage configured to produce a first sulfur stream and a second gas stream;
- a second adsorber fluidly connected to the first Claus catalytic stage, the second adsorber configured to remove water vapor from the second gas to produce a second dry gas stream, wherein the second adsorber comprises a molecular sieve, wherein the second dry gas stream comprises hydrogen sulfide and sulfur dioxide and is in the absence of water vapor;
- a second Claus catalytic stage fluidly connected to the second adsorber, the second Claus catalytic stage configured to produce a second sulfur stream and a third gas stream;
- a third adsorber fluidly connected to the second Claus catalytic stage, the third adsorber configured to remove water vapor from the third gas to produce a third dry gas stream, wherein the third adsorber comprises a molecular sieve, wherein the third dry gas stream comprises hydrogen sulfide and sulfur dioxide and is in the absence of water vapor; and
- a third Claus catalytic stage fluidly connected to the third adsorber, the third Claus catalytic stage configured to produce a third sulfur stream and a tail gas stream.

9. The system of claim 8, wherein a total conversion can be determined.

10. The system of claim 9, wherein the total conversion exceeds 99% by weight.

11. The system of claim 8, wherein the molecular sieve is molecular sieve 3A.

12. The system of claim 8, wherein the first Claus catalytic stage comprises:
- a first reheater fluidly connected to the first adsorber, the first reheater configured to increase a temperature of the first dry gas stream to produce a first hot dry gas stream, wherein the first hot dry gas stream is at a first temperature;
- a first catalytic reactor fluidly connected to the first reheater, the first catalytic reactor configured to convert hydrogen sulfide and sulfur dioxide to elemental sulfur to produce a first catalytic outlet stream, wherein the first catalytic outlet stream comprises hydrogen sulfide, sulfur dioxide, elemental sulfur and water; and
- a first condenser, the first condenser fluidly connected to the first catalytic reactor, the first condenser configured to condense the elemental sulfur in the first catalytic outlet stream to produce a first sulfur stream and the second gas stream, wherein the second gas stream comprises hydrogen sulfide, sulfur dioxide, and water vapor.

13. The system of claim 12, wherein the first temperature is 235° C.

14. The system of claim 8, wherein the second Claus catalytic stage comprises:
- a second reheater fluidly connected to the second adsorber, the second reheater configured to increase a temperature of the second dry gas stream to produce a second hot dry gas stream, wherein the second hot dry gas stream is at a second temperature;
- a second catalytic reactor fluidly connected to the second reheater, the second catalytic reactor configured to convert hydrogen sulfide and sulfur dioxide to elemental sulfur to produce a second catalytic outlet stream, wherein the second catalytic outlet stream comprises hydrogen sulfide, sulfur dioxide, elemental sulfur and water; and
- a second condenser, the second condenser fluidly connected to the second catalytic reactor, the second condenser configured to condense the elemental sulfur in the second catalytic outlet stream to produce a second sulfur stream and the second gas stream, wherein the second gas stream comprises hydrogen sulfide, sulfur dioxide, and water vapor.

15. The system of claim 14, wherein the second temperature is 215° C.

16. The system of claim 8, wherein the third Claus catalytic stage comprises:
- a third reheater fluidly connected to the third adsorber, the third reheater configured to increase a temperature of the third dry gas stream to produce a third hot dry gas stream, wherein the third hot dry gas stream is at a third temperature;
- a third catalytic reactor fluidly connected to the third reheater, the third catalytic reactor configured to convert hydrogen sulfide and sulfur dioxide to elemental sulfur to produce a third catalytic outlet stream, wherein the third catalytic outlet stream comprises hydrogen sulfide, sulfur dioxide, elemental sulfur and water; and
- a third condenser, the third condenser fluidly connected to the third catalytic reactor, the third condenser configured to condense the elemental sulfur in the third catalytic outlet stream to produce a third sulfur stream and the third gas stream, wherein the third gas stream comprises hydrogen sulfide, sulfur dioxide, and water vapor.

17. The system of claim 16, wherein the third temperature is 205° C.

* * * * *